(12) United States Patent
Ishida et al.

(10) Patent No.: US 12,252,620 B2
(45) Date of Patent: Mar. 18, 2025

(54) INK JET INK COMPOSITION, INK SET, AND INK JET RECORDING METHOD

(71) Applicant: Seiko Epson Corporation, Tokyo (JP)

(72) Inventors: Kohei Ishida, Matsumoto (JP); Kohei Sharyo, Kyoto (JP); Tsuyoshi Fukushima, Kyoto (JP)

(73) Assignee: SEIKO EPSON CORPORATION (JP)

( * ) Notice: Subject to any disclaimer, the term of this patent is extended or adjusted under 35 U.S.C. 154(b) by 1028 days.

(21) Appl. No.: 17/213,296

(22) Filed: Mar. 26, 2021

(65) Prior Publication Data

US 2021/0301160 A1 Sep. 30, 2021

(30) Foreign Application Priority Data

Mar. 27, 2020 (JP) .................................. 2020-057355

(51) Int. Cl.
 *C09D 11/102* (2014.01)
 *B41J 2/21* (2006.01)
 *C08G 18/12* (2006.01)
 *C08G 18/32* (2006.01)
 *C08G 18/40* (2006.01)
 *C08G 18/42* (2006.01)
 *C08G 18/62* (2006.01)
 (Continued)

(52) U.S. Cl.
 CPC ........... *C09D 11/102* (2013.01); *B41J 2/2107* (2013.01); *C08G 18/12* (2013.01); *C08G 18/3206* (2013.01); *C08G 18/4063* (2013.01); *C08G 18/4213* (2013.01); *C08G 18/6204* (2013.01); *C08G 18/755* (2013.01); *C08K 5/053* (2013.01); *C08K 5/06* (2013.01); *C08K 5/20* (2013.01); *C08L 75/06* (2013.01); *C08L 83/04* (2013.01); *C08L 91/06* (2013.01); *C09D 11/033* (2013.01); *C09D 11/037* (2013.01); *C09D 11/40* (2013.01); *C08L 2201/54* (2013.01)

(58) Field of Classification Search
 CPC ...... C09D 11/102; C08G 18/10; C08G 18/42; C08G 18/302
 See application file for complete search history.

(56) References Cited

U.S. PATENT DOCUMENTS

2020/0087854 A1 3/2020 Bertels et al.

FOREIGN PATENT DOCUMENTS

CN 110062831 A 7/2019
CN 113444400 B * 4/2023 ............ B41J 2/2107
(Continued)

*Primary Examiner* — Sophie Hon
(74) *Attorney, Agent, or Firm* — Harness, Dickey & Pierce, P.L.C.

(57) ABSTRACT

An ink jet ink composition which is an aqueous ink includes a resin dispersion, in which the resin dispersion is a polyurethane resin dispersion formed of a polyurethane resin (U) obtained by reacting an active hydrogen atom-containing component (A) containing a high-molecular-weight polyol component (a1) having a number-average molecular weight of 500 or more and an organic polyisocyanate component (B), and the high-molecular-weight polyol component (a1) includes a polyolefin polyol (a11) having a constituent unit represented by General Formula (1) and/or a constituent unit represented by General Formula (2), and a polyester polyol (a12) having a constituent unit represented by General Formula (3).

11 Claims, 1 Drawing Sheet

(51) Int. Cl.
 *C08G 18/75* (2006.01)
 *C08K 5/053* (2006.01)
 *C08K 5/06* (2006.01)
 *C08K 5/20* (2006.01)
 *C08L 75/06* (2006.01)
 *C08L 83/04* (2006.01)
 *C08L 91/06* (2006.01)
 *C09D 11/033* (2014.01)
 *C09D 11/037* (2014.01)
 *C09D 11/40* (2014.01)

(56) References Cited

FOREIGN PATENT DOCUMENTS

| EP | 3530472 A1 | * | 8/2019 | ................ B41J 2/01 |
|----|------------|---|--------|----------------------------|
| JP | 2019081826 A | * | 5/2019 | |
| JP | 2020-012014 A | | 1/2020 | |

* cited by examiner

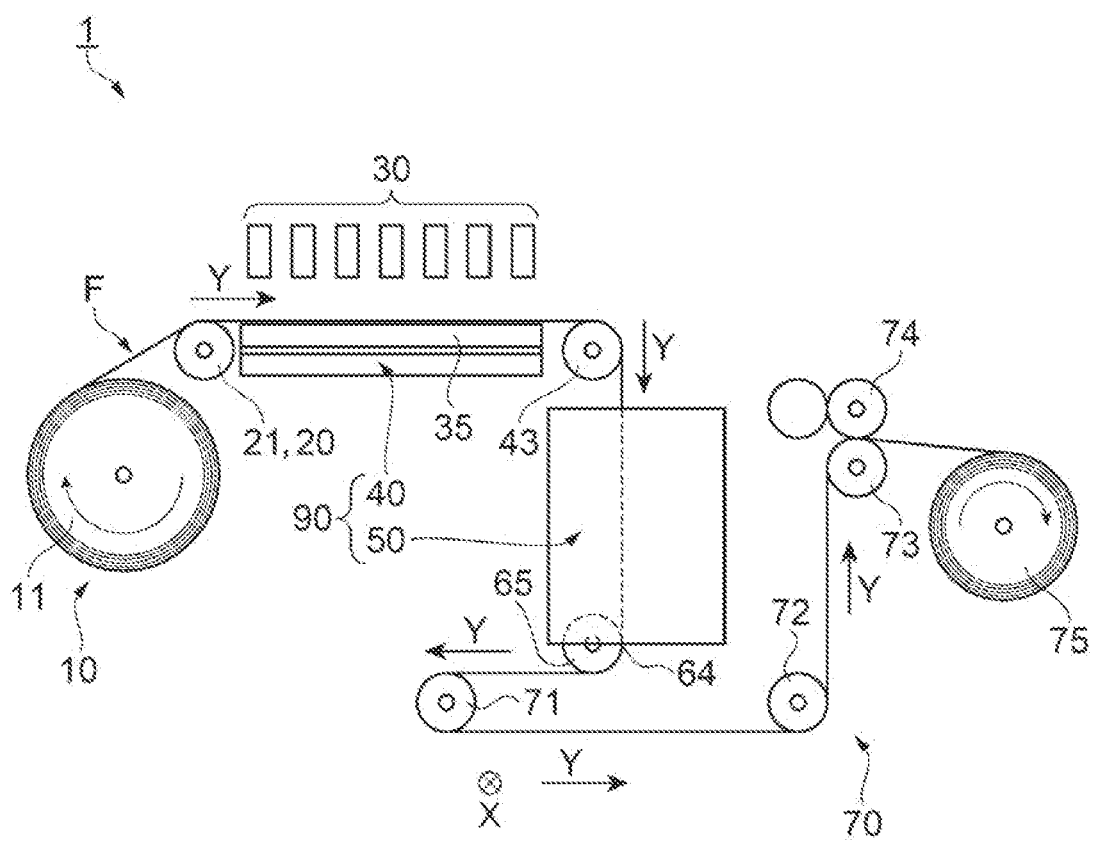

INK JET INK COMPOSITION, INK SET, AND INK JET RECORDING METHOD

The present application is based on, and claims priority from JP Application Serial Number 2020-057355, filed Mar. 27, 2020, the disclosure of which is hereby incorporated by reference herein in its entirety.

BACKGROUND

1. Technical Field

The present disclosure relates to an ink jet ink composition, an ink set, and an ink jet recording method.

2. Related Art

The use of an ink jet recording method for recording on a low-absorbent or non-absorbent recording medium as a recording medium is expected in the future. In such applications, inks using pigments as coloring materials are particularly useful as there is a demand for high levels of image color development and fastness (scratch resistance, light resistance, ozone gas resistance, water resistance, and the like).

With printed matter printed with pigment ink including a pigment as a coloring material, the pigment component is easily localized on the surface of the recording medium and the color development is high. The pigment stays on the surface of the recording medium due to the evaporation and penetration of vehicle components occurring during the process of attaching ink to the recording medium and after the attachment. However, in the pigment ink, since the pigment, which is a coloring material, tends to be present on the surface of the recording medium, the adhesion, abrasion resistance, and the like of the ink film are particularly important. In order to improve these characteristics in recording with pigment inks, research was carried out into adding urethane resin to inks (JP-A-2019-81826).

As film-based recording media, there are polar base materials having many polar groups such as PET and nylon, and low-polar base materials having few polar groups such as OPP. For both of these base materials, ink films are still insufficient in terms of inks able to obtain excellent characteristics such as adhesion.

SUMMARY

The present disclosure can be realized in the following aspects or application examples.

Aspect 1

According to an aspect of the present disclosure, there is provided an ink jet ink composition which is an aqueous ink including a resin dispersion, in which the resin dispersion is a polyurethane resin dispersion formed of a polyurethane resin (U) obtained by reacting an active hydrogen atom-containing component (A) containing a high-molecular-weight polyol component (a1) having a number-average molecular weight of 500 or more and an organic polyisocyanate component (B), and the high-molecular-weight polyol component (a1) includes a polyolefin polyol (a11) having a constituent unit represented by General Formula (1) and/or a constituent unit represented by General Formula (2), and a polyester polyol (a12) having a constituent unit represented by General Formula (3):

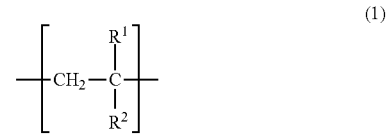

where, in Formula (1), $R^1$ represents a hydrogen atom, a methyl group, an ethyl group, a vinyl group, an isopropyl group, or an isopropenyl group and $R^2$ represents a hydrogen atom or a methyl group;

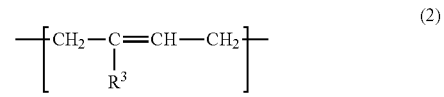

where, in Formula (2), $R^3$ represents a hydrogen atom or a methyl group.

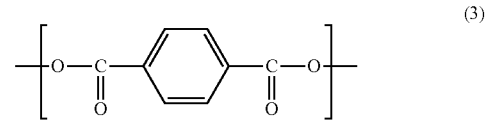

Aspect 2

In the ink jet ink composition according to aspect 1, a total mass of the constituent unit represented by General Formula (1) and the constituent unit represented by General Formula (2) of the polyurethane resin (U) is, based on a total mass of the polyurethane resin (U), 15% by mass to 55% by mass, and a mass of the constituent unit represented by General Formula (3) of the polyurethane resin (U) is, based on the total mass of the polyurethane resin (U), 4% by mass to 40% by mass.

Aspect 3

In the ink jet ink composition according to aspect 1 or 2, the polyolefin polyol (a11) includes a polyolefin polyol having the constituent unit represented by General Formula (1).

Aspect 4

In the ink jet ink composition according to any one of aspects 1 to 3, the active hydrogen atom-containing component (A) further contains a low-molecular-weight polyol component (a2) having no ionic group and having a chemical formula weight or a number-average molecular weight of less than 500, and/or a compound (a3) having an ionic group and an active hydrogen atom, and the low-molecular-weight polyol component (a2) contains a branched aliphatic diol having 3 to 12 carbon atoms.

Aspect 5

The ink jet ink composition according to any one of aspects 1 to 4 further includes one of a polyolefin wax or a silicone emulsion in an amount of 0.05% by mass to 5% by mass relative to a total mass of the ink jet ink composition.

Aspect 6

In the ink jet ink composition according to any one of aspects 1 to 5, the polyurethane resin dispersion is in an amount of 1% by mass to 20% by mass relative to a total mass of the ink composition.

Aspect 7

The ink jet ink composition according to any one of aspects 1 to 6 further includes an organic solvent.

Aspect 8

In the ink jet ink composition according to aspect 7, the organic solvent includes a nitrogen-containing solvent or glycol ethers having 8 or fewer carbon atoms.

Aspect 9

In the ink jet ink composition according to any one of aspects 1 to 8, the ink jet ink composition is used for recording on a polar base material and recording on a low-polar base material.

Aspect 10

According to another aspect of the present disclosure, there is provided an ink set including a white ink containing a white coloring material, and a non-white ink containing a non-white coloring material, in which at least one of the white ink and the non-white ink is the ink jet ink composition according to any one of aspects 1 to 9.

Aspect 11

According to still another aspect of the present disclosure, there is provided an ink jet recording method including ejecting the ink jet ink composition according to any one of aspects 1 to 9 from an ink jet head to attach the ink jet ink composition to a recording medium.

Aspect 12

In the ink jet recording method according to aspect 11, recording is performed using a white ink containing a white coloring material and a non-white ink containing a non-white coloring material, and at least one of the white ink and the non-white ink is the ink jet ink composition.

BRIEF DESCRIPTION OF THE DRAWING

FIGURE is a side view showing an example of an ink jet recording apparatus.

DESCRIPTION OF EXEMPLARY EMBODIMENTS

A description will be given below of several embodiments of the present disclosure. The embodiments described below illustrate examples of the present disclosure. The present disclosure is not at all limited to the embodiments below and includes various modifications implemented in a range in which the gist of the present disclosure is not changed. Here, not all of the configurations described below are necessarily essential configurations of the present disclosure.

1. Ink Jet Ink Composition

The ink jet ink composition of the present embodiment is an aqueous ink jet ink composition which is an aqueous ink containing a resin dispersion, in which the resin dispersion is a polyurethane resin dispersion formed of a polyurethane resin (U) obtained by reacting an active hydrogen atom-containing component (A) containing a high-molecular-weight polyol component (a1) having a number-average molecular weight of 500 or more and an organic polyisocyanate component (B), and the high-molecular-weight polyol component (a1) includes a polyolefin polyol (a11) having a constituent unit represented by General Formula (1) and/or a constituent unit represented by General Formula (2), and a polyester polyol (a12) having a constituent unit represented by General Formula (3):

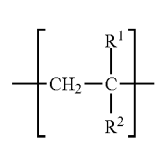

where, in the formula, $R^1$ represents a hydrogen atom, a methyl group, an ethyl group, a vinyl group, an isopropyl group, or an isopropenyl group and $R^2$ represents a hydrogen atom or a methyl group;

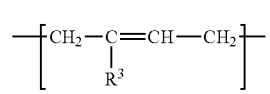

where, in the formula, $R^3$ represents a hydrogen atom or a methyl group.

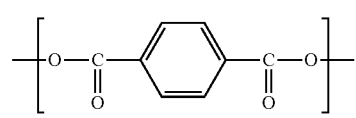

As film-based recording media, there are polar base materials having many polar groups, such as PET and nylon, and low-polar base materials having few polar groups, such as OPP. With such an ink jet ink composition, it is possible to obtain excellent adhesion of the ink film with respect to both of these base materials. Furthermore, it is possible to obtain excellent abrasion resistance with respect to both base materials.

The ink jet ink composition of the present embodiment contains the above resin dispersion. First, a description will be given of the resin dispersion. Then, a description will be given of other components.

1.1. Resin Dispersion

The resin dispersion contained in the ink jet ink composition of the present embodiment is a polyurethane resin aqueous dispersion (Q), which is formed of the polyurethane resin (U) obtained by reacting the active hydrogen atom-containing component (A) containing the high-molecular-weight polyol component (a1) and the organic polyisocyanate component (B).

The high-molecular-weight polyol component (a1) in the present disclosure contains the polyolefin polyol (a11) having a number-average molecular weight (abbreviated below as Mn) of 500 or more and having a constituent unit represented by General Formula (1) and/or a constituent unit represented by General Formula (2) and the polyester polyol (a12) having a number-average molecular weight (abbreviated below as Mn) of 500 or more and having a constituent unit represented by Chemical Formula (3), as essential components. Chemical Formula (3) is also described as General Formula (3).

Since (a1) contains (a11) and (a12), it is possible to obtain a polyurethane resin which has excellent adhesion with respect to both polar base materials such as PET and nylon and low-polar base materials such as OPP, and which is excellent in scratch resistance.

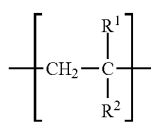

R¹ in General Formula (1) represents a hydrogen atom, a methyl group, an ethyl group, a vinyl group, an isopropyl group, or an isopropenyl group and R² represents a hydrogen atom or a methyl group. When the polyolefin polyol (a11) includes three or more consecutive methylene groups, it is interpreted that there is a constituent unit (ethylene group) in which R¹ and R² in General Formula (1) are hydrogen atoms.

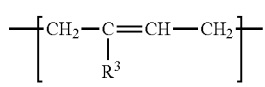

R³ in General Formula (2) represents a hydrogen atom or a methyl group.

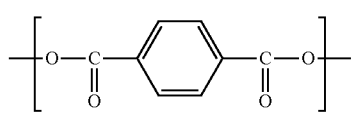

The polyolefin polyol (a11) is not particularly limited as long as it is a polyolefin polyol having a constituent unit represented by General Formula (1) and/or a constituent unit represented by General Formula (2) and specific examples thereof include polybutadiene polyols, hydrogenated polybutadiene polyols, polyisoprene polyols, hydrogenated polyisoprene polyols, hydroxyl group-modified polyolefins described in, for example, JP-A-2018-076428, which are able to be obtained by reacting acid-modified polyolefins, in which polyolefins are modified with unsaturated (poly) carboxylic acid (anhydrides), and amino alcohols, or the like. The polyolefin polyols (a11) may be used alone or in combination of two or more thereof.

Examples of commercially available products of the polyolefin polyol (a11) include NISSO-PB G series [polybutadiene polyol, produced by Nippon Soda Co., Ltd.], Poly bd series [polybutadiene polyol, produced by Idemitsu Kosan Co., Ltd.], NISSO-PB GI series [hydrogenated polybutadiene polyol, produced by Nippon Soda Co., Ltd.], Polytail H [hydrogenated polybutadiene polyol, produced by Mitsubishi Chemical Corporation], Poly ip series [polyisoprene polyol, produced by Idemitsu Kosan Co., Ltd.], EPOL series [hydrogenated polyisoprene polyol, produced by Idemitsu Kosan Co., Ltd.], and the like.

Among the polyolefin polyols (a11), from the viewpoints of adhesion of the polyurethane resin (U) to a low-polar base material such as OPP and scratch resistance, a polyolefin polyol having a constituent unit represented by General Formula (1) is preferable, polyolefin polyols having constituent units (i) and/or (ii) described below and polyolefin polyols having constituent units (iii) and (iv) described below are more preferable, polyolefin polyols having constituent units (i) and/or (ii) described below are particularly preferable, and a hydrogenated polybutadiene polyol is most preferable.

Constituent unit (i): A constituent unit in which R1 is an ethyl group and R2 is a hydrogen atom in General Formula (1).

Constituent unit (ii): A constituent unit in which R1 is a hydrogen atom and R2 is a hydrogen atom in General Formula (1) and in which two constituent units are linked.

Constituent unit (iii): A constituent unit in which R1 is a vinyl group and R2 is a hydrogen atom in General Formula (1).

Constituent unit (iv): A constituent unit in which R3 in General Formula (2) is a hydrogen atom.

From the viewpoint of achieving both adhesion of the polyurethane resin (U) to a polar base material such as PET or nylon and a low-polar base material such as OPP and scratch resistance, the total weight ratio of the constituent unit represented by General Formula (1) and the constituent unit represented by General Formula (2) in the polyurethane resin (U) is preferably 15% by weight to 55% by weight based on the weight of (U), more preferably 20% by weight to 50% by weight or more, and even more preferably 30% by weight to 50% by weight.

The constituent unit represented by General Formula (1) and the constituent unit represented by General Formula (2) are preferably constituent units derived from the polyolefin polyol (a11).

The polyester polyol (a12) is not particularly limited as long as it is a polyester polyol including a constituent unit represented by Chemical Formula (3) and examples thereof include polyester polyols obtained by dehydration condensation of terephthalic acid and a polyhydric alcohol having 2 to 20 carbon atoms, polyester polyols obtained by dehydration condensation of terephthalic acid, polyvalent carboxylic acids having 4 to 20 carbon atoms other than terephthalic acid, or ester-forming derivatives thereof and polyhydric alcohols having 2 to 20 carbon atoms, and the like. The polyester polyols (a12) may be used alone or in combination of two or more thereof.

Examples of polyhydric alcohols having 2 to 20 carbon atoms include linear diols having 2 to 12 carbon atoms or branched aliphatic diols having 3 to 12 carbon atoms [linear alcohols such as ethylene glycol, 1,3-propylene glycol, 1,4-butanediol, 1,5-pentanediol, 1,6-hexanediol, 1,7-heptanediol, 1,8-octanediol, 1,9-nonanediol, 1,10-dodecanediol, diethylene glycol, triethylene glycol, and tetraethylene glycol; branched alcohols such as 1,2-propylene glycol, 1,2-, 1,3-, or 2,3-butanediol, 2-methyl-1,4-butanediol, neopentyl glycol, 2,2-diethyl-1,3-propanediol, 2-methyl-1,5-pentanediol, 3-methyl-1,5-pentanediol, 2-methyl-1,6-hexanediol, 3-methyl-1,6-hexanediol, 2-methyl-1,7-heptanediol, 3-methyl-1,7-heptanediol, 4-methyl-1,7-heptanediol, 2-methyl-1,8-octanediol, 3-methyl-1,8-octanediol, 4-methyloctanediol, and the like]; alicyclic diols having 6 to 20 carbon atoms [1,4-cyclohexanediol, 1,3-cyclohexanedimethanol, 1,4-cyclohexanediol, 1,3-cyclopentanediol, 1,4-cycloheptanediol, 2,5-bis(hydroxymethyl)-1,4-dioxane, 2,7-norbornandiol, tetrahydrofuran dimethanol, 1,4-bis (hydroxyethoxy) cyclohexane, 1,4-bis(hydroxymethyl) cyclohexane, 2,2-bis(4-hydroxycyclohexyl) propane, and the like]; aromatic ring-containing diols having 8 to 20 carbon atoms [m- or p-xylylene glycol, bis(hydroxyethyl) benzene, bis(hydroxyethoxy) benzene, and the like]; triols having 3 to 20 carbon atoms [aliphatic triols (glycerin, trimethylolpropane, and the like), and the like]; 4 to 8 valent alcohols having 5 to 20 carbon atoms [aliphatic polyols (pentaerythritol, sorbitol, mannitol, sorbitan, diglycerin, dipentaerythritol, and the like)]; sugar (sucrose, glucose, mannose, fructose, methyl glucoside, and derivatives thereof); and the like. Among the above, from the viewpoint of the flexibility and adhesion of the polyurethane resin (U), a branched aliphatic diol having 3 to 12 carbon atoms is preferable.

Examples of polyvalent carboxylic acids having 4 to 20 carbon atoms other than terephthalic acid or ester-forming derivatives thereof include aliphatic dicarboxylic acids (succinic acid, adipic acid, azelaic acid, sebatic acid, fumaric acid, maleic acid, and the like), alicyclic dicarboxylic acids (dimeric acid and the like), aromatic dicarboxylic acids excluding terephthalic acids (phthalic acid, isophthalic acid, and the like), trivalent or higher polycarboxylic acids (trimellitic acid, pyromellitic acid, and the like), anhydrides thereof (succinic anhydride, maleic anhydride, phthalic anhydride, trimellitic anhydride, and the like), acid halides thereof (dichloride adipate and the like), low-molecular-weight alkyl esters thereof (dimethyl succinate, dimethyl phthalate, and the like), and mixtures thereof. Among these, from the viewpoint of the flexibility and adhesion of the polyurethane resin (U), aliphatic dicarboxylic acids and ester-forming derivatives thereof are preferable.

From the viewpoint of achieving both adhesion of the polyurethane resin (U) to a polar base material such as PET or nylon and a low-polar base material such as OPP and scratch resistance, the weight ratio of the constituent unit represented by Chemical Formula (3) in the polyurethane resin (U) is preferably 4% by weight to 40% by weight based on the weight of (U), more preferably 7% by weight to 30% by weight or more, and even more preferably 10% by weight to 25% by weight.

The constituent unit represented by Chemical Formula (3) is preferably a constituent unit derived from the polyester polyol (a12).

(a1) in the present disclosure may contain a polymer polyol (a13) other than (a11) and (a12). Examples of (a13) include Mn 500 or higher polyester polyols (a131), Mn 500 or higher polyether polyols (a132), and the like. The polymer polyols (a13) may be used alone or in combination of two or more thereof.

Examples of the polyester polyols (a131) include condensed polyester polyols other than (a12), polylactone polyols, polycarbonate diols, castor oil-based polyols, and the like.

Examples of the condensed polyester polyol other than (a12) include polyester polyols obtained by dehydration condensation of the polyhydric alcohol having 2 to 20 carbon atoms and a polyvalent carboxylic acid having 4 to 20 carbon atoms other than the terephthalic acid or an ester-forming derivative thereof, and the like.

Examples of commercially available products of condensed polyester polyols include Sanester 2610 [Mn=1000 polyethylene adipate diol, produced by Sanyo Chemical Industries, Ltd.], Sanester 4620 [Mn=2000 polytetramethylene adipate diol], and Sanester 2620 [Mn=2000 polyethylene adipate diol, produced by Sanyo Chemical Industries, Ltd.], Kuraray polyol P-2010 [Mn=2000 poly-3-methyl-1,5-pentane adipate diol], Kuraray polyol P-3010 [Mn=3000 poly-3-methyl-1,5-pentaneadipatediol], Kuraray polyol P-6010 [Mn=6000 poly-3-methyl-1,5-pentaneadipatediol], and the like.

The polylactone polyol is a heavy adduct of a lactone to the polyhydric alcohol having 2 to 20 carbon atoms and examples of the lactones include lactones having 4 to 12 carbon atoms (for example, γ-butyrolactone, γ-valerolactone, and ε-caprolactone), and the like. Specific examples of the polylactone polyol include polycaprolactone diol, polyvalerolactone diol, polycaprolactone triol, and the like.

Examples of polycarbonate diols include polycarbonate polyols produced by condensation while carrying out a dealcohol reaction, from one or two or more of the polyhydric alcohols having 2 to 20 carbon atoms, and a low-molecular-weight carbonate compound (for example, dialkyl carbonates having an alkyl group having 1 to 6 carbon atoms, alkylene carbonates having an alkylene group having 2 to 6 carbon atoms, diaryl carbonates having an aryl group having 6 to 9 carbon atoms).

Examples of commercially available products of polycarbonate diols include Duranol T6002 [Mn=2000 polycarbonate diol using 1,6-hexanediol, produced by Asahi Kasei Chemicals Co., Ltd.], ETERNACOLL UH-300 [Mn=3000 polycarbonate diol using 1,6-hexanediol], produced by Ube Industries, Ltd.], ETERNACOLL UM-90 (1/3) [Mn=900 polycarbonate diol using 1,4-cyclohexanedimethanol/1,6-hexanediol=1/3 (molar ratio), produced by Ube Industries, Ltd.], Duranol G4672 [Mn=2000 polycarbonate diol using 1,4-butanediol/1,6-hexanediol=70/30 (molar ratio), produced by Asahi Kasei Chemicals Co., Ltd.], Duranol T5652 [Mn=2000 polycarbonate diol using 1,5-pentanediol/1,6-hexanediol=50/50 (molar ratio), produced by Asahi Kasei Chemicals Co., Ltd.], Kuraray polyol C-2090 [Mn=2000 polycarbonate diol using 3-methyl-1,5-pentanediol/1,6-hexanediol=90/10 (molar ratio), produced by Kuraray Co., Ltd.], Kuraray polyol C-2050 [Mn=2000 polycarbonate diol using 3-methyl-1,5-pentanediol/1,6-hexanediol=50/50 (molar ratio), produced by Kuraray Co., Ltd.], and the like.

Castor oil-based polyols include castor oil and modified castor oil modified with a polyol or an alkylene oxide having 2 to 12 carbon atoms (abbreviated below as AO). It is possible to produce the modified castor oil by transesterification and/or AO addition of castor oil and a polyol. Examples of castor oil-based polyols include castor oil, trimethylolpropane-modified castor oil, pentaerythritol-modified castor oil, and castor oil ethylene oxide (abbreviated below as EO) adducts (addition mole number, 4 to 30 mol), and the like.

AOs having 2 to 12 carbon atoms include EO, propylene oxide (abbreviated below as PO), 1,2-, 2,3-, or 1,3-butylene oxide, tetrahydrofuran, 3-methyltetrahydrofuran, α-olefin oxide, styrene oxide, epichlorohydrin (epichlorohydrin and the like), and the like.

Examples of the polyether polyol (a132) include an aliphatic polyether polyol and an aromatic ring-containing polyether polyol.

Examples of the aliphatic polyether polyol include an AO adduct having 2 to 12 carbon atoms to the aliphatic polyhydric alcohol having 2 to 20 carbon atoms or the like and specific examples thereof include polyoxyalkylene polyols (polyethylene glycol and the like), polyoxypropylene polyol (polypropylene glycol and the like), polyoxyethylene/propylene polyol and polytetramethylene ether glycol, and the like.

Examples of commercially available products of aliphatic polyether polyols include PTMG1000 [Mn=1000 poly(oxytetramethylene) glycol, produced by Mitsubishi Chemical Corporation], PTMG2000 [Mn=2000 poly(oxytetramethylene) glycol, produced by Mitsubishi Chemical Corporation], PTMG3000 [Mn=3000 poly(oxytetramethylene) glycol, produced by Mitsubishi Chemical Corporation], PTGL2000 [Mn=2000 modified poly(oxytetramethylene) glycol, produced by Hodogaya Chemical Co., Ltd.], PTGL3000 [Mn=3000 modified poly(oxytetramethylene) glycol, produced by Hodogaya Chemical Co., Ltd.], Sannix PP-2000 [Mn=2000 polyoxypropylene glycol, produced by Sanyo Chemical Industries, Ltd.], Sannix Diol GP-3000 [Mn=3000 polyoxypropylene triol, produced by Sanyo Chemical Industries, Ltd.], TEGOMER D3403 [Mn=1,200 polyoxyethylene polyol, produced by Evonik Degussa], Ymer N120 [Mn=1,000 polyoxyethylene polyol, produced by Perstorp Co., Ltd.], and the like.

Examples of the aromatic polyether polyol include polyols having a bisphenol skeleton such as EO adducts of bisphenol A (EO 2 mol adduct of bisphenol A, EO 4 mol adduct of bisphenol A, EO 6 mol adduct of bisphenol A, EO 8 mol adduct of bisphenol A, EO 10 mol adduct of bisphenol A, EO 20 mol adduct of bisphenol A, and the like) and PO adducts of bisphenol A (PO 2 mol adduct of bisphenol A, PO 3 mol adduct of bisphenol A, PO 5 mol adduct of bisphenol A, and the like), and EO or PO adducts of resorcin, and the like.

From the viewpoint of the flexibility and mechanical properties of the polyurethane resin (U), the Mn of the polymer polyol forming the high-molecular-weight polyol component (a1) is preferably 500 to 6000, and more preferably 1000 to 4000.

It is possible to measure the Mn of the polyol in the present disclosure by gel permeation chromatography under the conditions below, for example.

Apparatus: "Waters Alliance 2695" [produced by Waters]
Column: "Guard column Super HL" (1), linked to one each of "TSKgel SuperH2000, TSKgel SuperH3000, and TSKgel SuperH4000 (all produced by Tosoh Corporation)"
Sample solution: 0.25% by weight tetrahydrofuran solution
Solution filling amount: 10 µl
Flow rate: 0.6 ml/min
Measurement temperature: 40° C.
Detection apparatus: Refractive index detector
Reference substance: Standard polyethylene glycol In addition to the high-molecular-weight polyol component (a1), it is possible for the active hydrogen atom-containing component (A) in the present disclosure to contain the low-molecular-weight polyol component (a2) having no ionic group and having a chemical formula weight or a number-average molecular weight of less than 500, the compound (a3) having an ionic group and an active hydrogen atom, a chain extender (a4) other than (a2), and a reaction terminator (a5).

Examples of the low-molecular-weight polyol component (a2) having no ionic group and having a chemical formula weight or a number-average molecular weight of less than 500 include the polyhydric alcohol having 2 to 20 carbon atoms. The low-molecular-weight polyol component (a2) may be used alone or in combination of two or more thereof.

Among (a2), from the viewpoint of the flexibility, adhesion, scratch resistance, and mechanical properties of the polyurethane resin (U), the branched aliphatic diol having 3 to 12 carbon atoms is preferable, and neopentyl glycol is more preferable.

Examples of the compound (a3) having an ionic group and an active hydrogen atom include a compound (a31) containing an anionic group and an active hydrogen atom and a compound (a32) containing a cationic group and an active hydrogen atom. The compounds (a3) may be used alone or in combination of two or more thereof.

Examples of (a31) include compounds containing a carboxyl group as an anionic group and having 2 to 10 carbon atoms [dialkylol alkanoic acid (for example, 2,2-dimethylol propionic acid, 2,2-dimethylol butanoic acid, 2,2-dimethylol heptanic acid, and 2,2-dimethylol octanoic acid), tartrate and amino acids (for example, glycine, alanine, and valine), and the like], compounds containing a sulfonic acid group as an anionic group and having 2 to 16 carbon atoms [3-(2,3-dihydroxypropoxy)-1-propanesulfonic acid and sulfoisophthalic acid di(ethylene glycol) ester, and the like], compounds containing a sulfamic acid group as an anionic group and having 2 to 10 carbon atoms [N,N-bis(2-hydroxylethyl) sulfamic acid, and the like] and the like, and salts obtained by neutralizing these compounds with a neutralizing agent. The compounds (a31) may be used alone or in combination of two or more thereof.

Examples of the neutralizing agent used for the salt of (a31) include ammonia, amine compounds having 1 to 20 carbon atoms, and alkali metal hydroxides (sodium hydroxide, potassium hydroxide, lithium hydroxide, and the like). Examples of the amine compound having 1 to 20 carbon atoms include primary amines such as monomethylamine, monoethylamine, monobutylamine, and monoethanolamine, secondary amines such as dimethylamine, diethylamine, dibutylamine, diethanolamine and diisopropanolamine, and methylpropanolamine, tertiary amines such as trimethylamine, triethylamine, dimethylethylamine, dimethylmonoethanolamine, and triethanolamine. The neutralizing agents used for the salt of (a31) may be used alone or in combination of two or more thereof.

As the neutralizing agent used for the salt of (a31), from the viewpoint of the drying property of the generated polyurethane resin aqueous dispersion (Q) and the water resistance of the obtained film, a compound having a high vapor pressure at 25° C. is preferable. From this point of view, as the neutralizing agent used for the salt of (a31), ammonia, monomethylamine, monoethylamine, dimethylamine, diethylamine, trimethylamine, triethylamine, and dimethylethylamine are preferable.

Among (a31), from the viewpoints of the mechanical properties and water resistance of the obtained film and the dispersion stability of the polyurethane resin aqueous dispersion (Q), 2,2-dimethylolpropionic acid and 2,2-dimethylolbutanoic acid and salts thereof are preferable, and ammonia of 2,2-dimethylolpropionic acid and 2,2-dimethylolpropane acid or salts neutralized with amine compounds having 1 to 20 carbon atoms are more preferable.

Examples of the compound (a32) containing a cationic group and an active hydrogen atom include compounds having a tertiary amino group as a cationic group and a hydroxyl group as an active hydrogen atom, and salts obtained by neutralizing a compound such as a diol containing a tertiary amino group having 1 to 20 carbon atoms [N-alkyldialkanolamines (for example, N-methyldiethanolamine, N-propyldiethanolamine, N-butyldiethanolamine and N-methyldipropanolamine) and N,N-dialkylmonoalkanolamines (for example, N,N-dimethylethanolamine), and the like] with a neutralizing agent.

Examples of the neutralizing agent used for the salt of (a32) include monocarboxylic acids having 1 to 10 carbon atoms (for example, formic acid, acetic acid, propanoic acid, and the like), carbonic acid, dimethyl carbonate, dimethyl sulfate, methyl chloride, benzyl chloride, and the like.

The neutralizing agent used for the salts of (a31) and (a32) may be added at any time before the urethanization reaction, during the urethanization reaction, after the urethanization reaction, before the water dispersion step, during the water dispersion step, or after the water dispersion step; however, from the viewpoint of the stability of the urethane resin and the stability of the aqueous dispersion, adding before the water dispersion step or during the water dispersion step is preferable. In addition, a neutralizing agent volatilized at the time of solvent removal may be additionally added after the solvent is removed and it is possible to freely select the neutralizing agent type to be additionally added from the above description or the like.

The content of the ionic group introduced by (a3) in (U) is preferably 0.1 to 1.5 mmol/g based on the weight of (U), more preferably 0.1 to 1.2 mmol/g, and particularly preferably 0.1 to 0.9 mmol/g.

The content of the ionic group in the present disclosure means the % by weight of the non-neutralized cationic group or the anionic group and does not include the weight of the counterions. For example, the content of the ionic group in (a31) indicates the % by weight of the carboxyl group (—COOH) in the case of the triethylamine salt of 2,2-dimethylolpropionic acid and the % by weight of the sulfo group (—$SO_3H$) in the case of a triethylamine salt of 3-(2,3-dihydroxypropoxy)-1-propanesulfonic acid. In addition, the content of the ionic group in (a32) indicates the % by weight of only the nitrogen atoms in the tertiary amino group.

Examples of the chain extender (a4) other than (a2) include water, aliphatic polyamines having 2 to 36 carbon atoms [alkylenediamines such as ethylenediamine and hexamethylenediamine; poly (n=2 to 6) alkylene (2 to 6 carbon atoms) poly (n=3 to 7) amines such as diethylenetriamine, dipropylenetriamine, dihexylenetriamine, triethylenetetramine, tetraethylenepentamine, pentaethylenehexamine, and hexaethyleneheptamine, and the like], alicyclic polyamines having 6 to 20 carbon atoms (1,3- or 1,4-diaminocyclohexane, 4,4'- or 2,4'-dicyclohexylmethanediamine, isophoronediamine, and the like), aromatic polyamines having 6 to 20 carbon atoms (1,3- or 1,4-phenylenediamine, 2,4- or 2,6-tolylenediamine, 4,4'- or 2,4'-methylenebisaniline, and the like), heterocyclic polyamines having 3 to 20 carbon atoms (2,4-diamino-1,3,5-triazine, piperazine, N-aminoethyl piperazine, and the like), hydrazine or derivatives thereof (dibasic acid dihydrazide, for example, adipate dihydrazide, and the like), amino alcohols having 2 to 20 carbon atoms (for example, ethanolamine, diethanolamine, 2-amino-2-methylpropanol, and triethanolamine), and the like. The chain extender (a4) may be used alone or in combination of two or more thereof.

Examples of the reaction terminator (a5) include monoalcohols having 1 to 20 carbon atoms (methanol, ethanol, butanol, octanol, decanol, dodecyl alcohol, myristyl alcohol, cetyl alcohol, stearyl alcohol, and the like), monoamines having 1 to 20 carbon atoms (monoalkanolamines or dialkanolamines such as monomethylamine, monoethylamine, monobutylamine, dibutylamine, and monooctylamine, a mono- or diakanolamine such as monoethanolamine, diethanolamine, and diisopropanolamine, and the like). The reaction terminators (a5) may be used alone or in combination of two or more thereof.

Preferably, the active hydrogen atom-containing component (A) in the present disclosure contains, in addition to the high-molecular-weight polyol component (a1), the low-molecular-weight polyol component (a2) having no ionic group and having a chemical formula weight or a number-average molecular weight of less than 500 and/or the compound (a3) having an ionic group and an active hydrogen atom, and the low-molecular-weight polyol component (a2) is a branched aliphatic diol having 3 to 12 carbon atoms.

Examples of the organic polyisocyanate component (B) in the present disclosure include an aromatic polyisocyanate (b1) having 2 to 3 or more isocyanate groups and having 8 to 26 carbon atoms, an aliphatic polyisocyanate (b2) having 4 to 22 carbon atoms, an alicyclic polyisocyanate (b3) having 8 to 18 carbon atoms, an aromatic aliphatic polyisocyanate (b4) having 10 to 18 carbon atoms, a modified product (b5) of these polyisocyanates, and the like. The organic polyisocyanate component (B) may be used alone or in combination of two or more thereof.

Examples of the aromatic polyisocyanate (b1) having 8 to 26 carbon atoms include 1,3- or 1,4-phenylene diisocyanate, 2,4- or 2,6-tolylene diisocyanate (below, tolylene diisocyanate is abbreviated as TDI), crude TDI, 4,4'- or 2,4'-diphenylmethane diisocyanate (below, diphenylmethane diisocyanate is abbreviated as MDI), crude MDI, polyarylpolyisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, 4,4',4''-triphenylmethane triisocyanate, and m- or p-isocyanatophenylsulfonylisocyanate.

Examples of the aliphatic polyisocyanate (b2) having 4 to 22 carbon atoms include ethylene diisocyanate, tetramethylene diisocyanate, hexamethylene diisocyanate (below, abbreviated as HDI), dodecamethylene diisocyanate, 1,6,11-undecantryisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate.

Examples of the alicyclic polyisocyanate (b3) having 8 to 18 carbon atoms include isophorone diisocyanate (below, abbreviated as IPDI), 4,4'-dicyclohexylmethane diisocyanate (below, abbreviated as hydrogenated MDI), cyclohexylene diisocyanate, methylcyclohexylene diisocyanate, bis(2-isocyanatoethyl)-4-cyclohexene-1,2-dicarboxylate, and 2,5- or 2,6-norbornan diisocyanate.

Examples of the aromatic aliphatic polyisocyanate (b4) having 10 to 18 carbon atoms include m- or p-xylylene diisocyanate and α,α,α',α'-tetramethylxylylene diisocyanate.

The modified products (b5) of the polyisocyanates of (b1) to (b4) include modified products of the polyisocyanates (modified products containing a urethane group, a carbodiimide group, an alohanate group, a urea group, an abiuret group, a uretdione group, a uretonimine group, an isocyanurate group, or an oxazolidone group, and the like; modified products having a free isocyanate group content of 8% by weight to 33% by weight, preferably 10% by weight to 30% by weight, particularly 12% by weight to 29% by weight), for example, modified products of polyisocyanates such as modified MDI (urethane-modified MDI, carbodiimide-modified MDI, trihydrocarbyl phosphate-modified MDI, and the like), urethane-modified TDI, biuret-modified HDI, isocyanurate-modified HDI, and isocyanurate-modified IPDI.

Among the organic polyisocyanate components (B), from the viewpoint of the flexibility and adhesion of the polyurethane resin (U), an alicyclic polyisocyanate (b3) having 8 to 18 carbon atoms is preferable, and IPDI is more preferable.

From the viewpoint of the flexibility, mechanical properties, scratch resistance, and adhesion of (U), the urethane group concentration of the polyurethane resin (U) in the present disclosure is preferably 1.0 to 2.7 mmol/g based on the weight of (U), more preferably 1.3 to 2.5 mmol/g, and particularly preferably 1.5 to 2.3 mmol/g.

From the viewpoint of the flexibility, mechanical properties, scratch resistance, and adhesion of (U), the urea group concentration of the polyurethane resin (U) in the present disclosure is preferably 0.1 to 0.7 mmol/g based on the weight of (U), more preferably 0.2 to 0.6 mmol/g, and particularly preferably 0.3 to 0.5 mmol/g.

From the viewpoint of the mechanical properties, adhesion, and scratch resistance of (U), the Mn of the polyurethane resin (U) in the present disclosure is preferably 10,000 to 1,000,000.

It is possible to measure the Mn of the polyurethane resin (U) in the present disclosure by gel permeation chromatography under the conditions below, for example.

Apparatus: "HLC-8220 GPC" [produced by Tosoh Corporation] Column: "Guard column α"+"TSKgel α-M" [both produced by Tosoh Corporation] Sample solution: 0.125% by weight dimethylformamide solution
Solution filling amount: 100 µl
Flow rate: 1 ml/min
Measurement temperature: 40° C.
Detection apparatus: Refractive index detector
Reference substance: Standard polystyrene It is possible to add additives such as antioxidants, color prevention agents, weather stabilizers, plasticizers, and mold release agents to the polyurethane resin (U) in the present disclosure, as necessary. The amount of these additives used is preferably 10% by weight or less based on the weight of (U), more preferably 3% by weight or less, and particularly preferably 1% by weight or less.

It is also possible to disperse the polyurethane resin (U) in an aqueous medium using a dispersant (H) instead of the compound (a3) having an ionic group and an active hydrogen group, or in combination with (a3); however, from the viewpoint of the water resistance of the obtained dry film, it is preferable to have a self-emulsifying aqueous dispersion using only (a3).

Examples of the dispersant (H) include nonionic surfactants (h1), anionic surfactants (h2), cationic surfactants (h3), amphoteric surfactants (h4), and other emulsion dispersants (h5). The dispersants (H) may be used alone or in combination of two or more thereof.

Examples of (h1) include AO-added-type nonionic surfactants and polyhydric alcohol-type nonionic surfactants. Examples of the AO-added-types include EO adducts of an aliphatic alcohol having 10 to 20 carbon atoms, EO adducts of phenol, EO adducts of nonylphenol, EO adducts of alkylamine having 8 to 22 carbon atoms, EO adducts of polypropylene glycol, and the like and examples of the polyhydric alcohol-type include polyhydric (3 to 8 valent or higher) alcohol (2 to 30 carbon atoms) fatty acid (8 to 24 carbon atoms) esters (for example, glycerin monostearate, glycerin monooleate, sorbitan monolaurate, and sorbitan monooleate), alkyl (4 to 24 carbon atoms) poly (polymerization degree 1 to 10) glycoside, and the like.

Examples of (h2) include ether carboxylic acids having a hydrocarbon group having 8 to 24 carbon atoms or salts thereof [sodium lauryl ether acetate and (poly)oxyethylene (addition mole number, 1 to 100) sodium lauryl ether acetate, and the like]; ester sulfates or ether sulfate esters having a hydrocarbon group having 8 to 24 carbon atoms and salts thereof [sodium lauryl sulfate, (poly)oxyethylene (addition mole number, 1 to 100) sodium lauryl sulfate, (poly)oxyethylene (addition mole number, 1 to 100 moles), lauryl sulfate triethanolamine, and (poly)oxyethylene (addition mole number, 1 to 100) coconut oil fatty acid monoethanolamide sodium sulfate, and the like]; sulfonates having a hydrocarbon group having 8 to 24 carbon atoms [sodium dodecyl benzene sulfonate, and the like]; sulfosuccinates having one or two hydrocarbon groups having 8 to 24 carbon atoms; phosphoric acid esters or ether phosphate esters having a hydrocarbon group having 8 to 24 carbon atoms and salts thereof [sodium lauryl phosphate and (poly)oxyethylene (addition mole number, 1 to 100) sodium lauryl ether phosphate, and the like]; fatty acid salts having a hydrocarbon group having 8 to 24 carbon atoms [sodium laurate, triethanolamine laurate, and the like]; and acylated amino acid salts having a hydrocarbon group having 8 to 24 carbon atoms [coconut oil fatty acid methyl taurine sodium, coconut oil fatty acid sarcosine sodium, coconut oil fatty acid sarcosine triethanolamine, N-coconut oil fatty acid acyl-L-glutamic acid triethanolamine, N-coconut oil fatty acid acyl-L-monosodium glutamate, and lauroylmethyl-β-alanine sodium, and the like].

Examples of (h3) include quaternary ammonium salt types [stearyltrimethylammonium chloride, behenyltrimethylammonium chloride, distearyldimethylammonium chloride, lanolin fatty acid aminopropylethyldimethylammonium ethyl sulfate, and the like] and amine salt types [diethylaminoethyl stearate amido lactate, dilaurylamine hydrochloride, oleylamine lactate, and the like].

Examples of (h4) include betaine-type amphoteric surfactants [coconut oil fatty acid amide propyl dimethylaminoacetic acid betaine, lauryl dimethylamino acetate betaine, 2-alkyl-N-carboxymethyl-n-hydroxyethyl imidazolinium betaine, lauryl hydroxysulfo betaine, lauroylamide ethylhydroxyethylcarboxymethyl betaine hydroxypropyl phosphate, and the like] and amino acid-type amphoteric surfactants [β-laurylaminopropionate, and the like].

Examples of (h5) include polyvinyl alcohol, starch, and derivatives thereof, cellulose derivatives such as carboxymethyl cellulose, methyl cellulose, and hydroxyethyl cellulose, carboxyl group-containing (co) polymers such as sodium polyacrylate, emulsion dispersants having a urethane group or an ester group described in U.S. Pat. No. 5,906,704 [for example, an emulsion dispersant in which a polycaprolactone polyol and a polyether diol are linked with a polyisocyanate], and the like.

The dispersant (H) may be added at any time after the urethanization reaction of the polyurethane resin (U), before the water dispersion step of (U), during the water dispersion step, or after the water dispersion; however, from the viewpoint of the dispersibility of (U) and stability of the aqueous dispersion, adding before the water dispersion step or during the water dispersion step is preferable.

When (H) is used, from the viewpoint of the water resistance of the dry film, the dispersibility of the polyurethane resin (U), and the stability of the aqueous dispersion, the content thereof is preferably 0.01% by weight to 15% by weight based on the weight of the polyurethane resin (U), more preferably 0.01% by weight to 10% by weight, and particularly preferably 0.01% by weight to 5% by weight.

Examples of the method for producing the polyurethane resin aqueous dispersion (Q) of the present disclosure include methods [1] and [2] below or the like.

[1] A method in which the active hydrogen atom-containing component (A) containing the high-molecular-weight polyol component (a1), the low-molecular-weight polyol component (a2) having no ionic group and having a chemical formula weight or a number-average molecular weight of less than 500 as necessary, the compound (a3) having an ionic group and an active hydrogen group, the chain extender (a4) other than (a2), and the reaction terminator (a5) is reacted with an organic polyisocyanate component (B) in the presence or absence of the organic solvent (S) in one step or multiple steps to produce a polyurethane resin (U), and, as necessary, after dispersing the ionic group portion introduced by (a3) as a salt in an aqueous medium with a neutralizing agent, the organic solvent (S) is distilled off as necessary.

[2] A method in which an active hydrogen atom-containing component (A) containing the high-molecular-weight polyol component (a1), the low-molecular-weight polyol component (a2) having no ionic group and having a chemical formula weight or a number-average molecular weight of less than 500 as necessary, the compound (a3) having an ionic group and an active hydrogen group, and the chain extender (a4) other than (a2) is reacted with the organic polyisocyanate component (B) in the presence or absence of the organic solvent (S) in one step or multiple steps to produce a urethane prepolymer (P) having an isocyanate group, then, as necessary, the hydrophilic group portion introduced by (a3) in the prepolymer (P) is dispersed as a salt in an aqueous medium by neutralization, the chain extender (a4) other than (a2) and/or the reaction terminator (a5) are reacted until the isocyanate groups in the prepolymer (P) are substantially eliminated, and then the organic solvent (S) is distilled off as necessary.

Between the methods [1] and [2], from the viewpoint of the dispersion stability of the polyurethane resin (U) and the mechanical strength of the dry film, method [2] is preferable.

In addition, from the viewpoint of the dispersion stability of the polyurethane resin (U), a method of producing the urethane prepolymer (P) in multiple steps to produce the polyurethane resin aqueous dispersion (Q) is more preferable, and a method in which the active hydrogen atom-containing component (A) containing the high-molecular-weight polyol component (a1) other than (a12) and, as necessary, (a2), (a3), and (a4) is reacted with the organic polyisocyanate component (B) in the presence or absence of the organic solvent (S) to produce a urethane prepolymer (P1) having an isocyanate group, and then the obtained urethane prepolymer (P1) and (a12) are reacted to produce a urethane prepolymer (P2) having an isocyanate group, and then, as necessary, the ionic group portion introduced by (a3) in the prepolymer (P2) is dispersed as a salt in an aqueous medium by neutralization to react (a4) and/or (a5) until the isocyanate groups in the prepolymer (P2) are substantially eliminated, and then the organic solvent (S) is distilled off as necessary is particularly preferable.

From the viewpoint of suppressing side reactions, the reaction temperature for producing the polyurethane resin (U) in method [1] and the urethane prepolymer (P) in method [2] is preferably 60° C. to 120° C., more preferably 60° C. to 110° C., and particularly preferably 60° C. to 100° C. It is possible to appropriately select the production time depending on the equipment to be used; however, in general, 1 minute to 100 hours is preferable, 3 minutes to 30 hours is more preferable, and 5 minutes to 20 hours is particularly preferable.

The organic solvent (S) which may be used in the production of the polyurethane resin dispersion is selected from solvents which are substantially non-reactive with the isocyanate group, for example, ketone-based solvents (for example, acetone and methyl ethyl ketone), ester-based solvents [for example, ethyl acetate, dibasic acid ester (DBE)], ether-based solvents (for example, tetrahydrofuran), amide-based solvents (for example, N,N-dimethylformamide and N-methylpyrrolidone), aromatic hydrocarbon-based solvents (for example, toluene), and the like. These organic solvents (S) may be used alone or in combination of two or more thereof. In addition, the aqueous medium in the present disclosure means water or a mixture of water and the organic solvent (S).

The organic solvent (S) is preferably an organic solvent having a boiling point of less than 100° C. and examples thereof include acetone, methyl ethyl ketone, ethyl acetate, tetrahydrofuran, and the like. When an organic solvent having a boiling point of 100° C. or higher is used, it is difficult to completely remove only the organic solvent from the aqueous medium, the organic solvent remains in the aqueous dispersion, and the organic solvent is generated during drying, which is not preferable. In addition, the organic solvent tends to remain in the film and the mechanical properties of the film change over time, which is not preferable.

From the viewpoints of odor, stability over time, environmental load, and safety, the content of the organic solvent (S) in the polyurethane resin aqueous dispersion (Q) is preferably 1% by weight or less based on the weight of (Q), more preferably 0.8% by weight or less, and particularly preferably 0.5% by weight or less.

In the urethanization reaction in methods [1] and [2] described above, it is possible to use a known urethanization catalyst or the like as necessary in order to promote the reaction. The added amount of the urethanization catalyst is preferably 0.001% by weight to 3% by weight based on the weight of the polyurethane resin (U) or prepolymer (P), more preferably 0.005% by weight to 2% by weight, and particularly preferably 0.01% by weight to 1% by weight.

Examples of the urethanization catalyst include metal catalysts [tin-based catalysts (trimethyltin laurate, trimethyltin hydroxide, dimethyltin dilaurate, dibutyltin diacetate, dibutyltin dilaurate, stanas octoate, dibutyltin maleate, and the like), lead-based catalysts (lead oleate, lead 2-ethylhexanoate, lead naphthenate, lead octenoate, and the like), cobalt-based catalysts (cobalt naphthenate, and the like), bismuth-based catalysts {bismuthtris(2-ethylhexanoate, and the like), and mercury-based catalysts (phenylmercury propionate, and the like), and the like}], amine catalysts [triethylenediamine, tetramethylethylenediamine, tetramethylhexylene diamine, diazabicycloalkene {1,8-diazabicyclo [5.4.0]-7-undecene}, and the like; dialkylaminoalkylamines {dimethylaminoethylamine, dimethylaminopropylamine, diethylaminopropylamine, dibutylaminoethylamine, dimethylaminooctylamine, dipropylaminopropylamine, and the like} or heterocyclic aminoalkylamines [2-(1-aziridinyl)ethylamine and 4-(1-piperidinyl)-2-hexylamine, and the like] carbonates or organic acid salts (formate or the like), and the like; N-methylmorpholin, N-ethylmorpholin, triethylamine, diethylethanolamine, dimethylethanolamine, and the like], and mixtures of two or more thereof.

The apparatus for dispersing the polyurethane resin (U) or the organic solvent solution thereof in method [1], and the urethane prepolymer (P) or the organic solvent solution thereof in method [2] in water is not particularly limited; however, a rotating type dispersion mixing apparatus, an ultrasonic type dispersion machine, or a kneader is preferably used, and, among these, a rotating type dispersion mixing apparatus having a particularly excellent dispersion ability is more preferable.

Examples of the rotating type dispersion mixing apparatuses include a mixing apparatus having general stirring blades such as MaxBlend and a helical blade, a TK homomixer [produced by Primix Corporation], Clearmix [produced by M Technique Co., Ltd.], Filmix [produced by Primix Corporation], Ultra-Turrax [produced by IKA Co., Ltd.], Ebara Milder [produced by Ebara Corporation], Cavitron (produced by Eurotec Co., Ltd.), Biomixer [produced by Nippon Seiki Co., Ltd.], and the like.

The volume average particle size (Dv) of the polyurethane resin (U) in the ink is preferably 0.01 to 1.0 µm, and more preferably 0.01 to 0.5 µm. When (Dv) is 0.01 µm or more, the viscosity of the polyurethane resin aqueous dispersion (Q) is appropriate and the handleability is good, and when 0.5 µm or less, the dispersion stability is good.

It is possible to control the volume average particle size (Dv) of (U) according to the amount of the ionic group, neutralizing agent, and dispersant in (U), the type of dispersion machine used in the dispersion step, and the dispersion conditions.

It is possible to measure the volume average particle size (Dv) with a light scattering particle size distribution measuring apparatus. Examples thereof include "LA950 V2" produced by HORIBA, Ltd.

From the viewpoint of handleability, the viscosity of the polyurethane resin aqueous dispersion (Q) at 25° C. is preferably 5000 mPa·s or less, and more preferably 1000 mPa·s or less. It is possible to measure the viscosity using a BL type viscometer.

From the viewpoint of dispersion stability, the pH of the polyurethane resin aqueous dispersion (Q) at 25° C. is preferably 2 to 12, and more preferably 4 to 10. It is possible to measure the pH using a pH Meter M-12 [produced by HORIBA, Ltd.].

The printing ink (L) of the present disclosure contains the polyurethane resin aqueous dispersion (Q) of the present disclosure. By using (Q), it is possible to obtain a printing ink having excellent image adhesion and scratch resistance.

The total content of the polyurethane resin dispersion described above in the ink jet ink composition of the present embodiment is preferably 1% or more and 20.0% or less in terms of solid content on a mass basis (below % simply indicates % by mass), and more preferably 2.0% or more and 15.0% or less. Furthermore, 4.0% or more and 12.0% or less is more preferable.

1.2. Other Components

The ink of the present embodiment may further contain other components.

1.2.1. Water

The ink jet ink composition according to the present embodiment includes water. Examples of water include pure water such as ion-exchanged water, ultra-filtered water, reverse osmosis water, and distilled water, and water from which ionic impurities are removed as much as possible, such as ultrapure water. In addition, when water sterilized by irradiation with ultraviolet rays, the addition of hydrogen peroxide, or the like is used, it is possible to prevent outbreaks of bacteria and fungi in a case in which the ink jet ink composition is stored for a long period of time.

The content of water is 30% by mass or more relative to the total amount of the ink jet ink composition, preferably 40% by mass or more, more preferably 45% by mass or more, and even more preferably 50% by mass or more. The term water in the ink jet ink composition includes, for example, water coming from a polymer particle dispersion liquid used as a raw material, a pigment dispersion liquid, water to be added, and the like. Setting the water content to 30% by mass or more makes it possible for the viscosity of the ink jet ink composition to be relatively low. In addition, the upper limit of the water content is preferably 90% by mass or less relative to the total amount of the ink jet ink composition, more preferably 85% by mass or less, and even more preferably 80% by mass or less.

The ink jet ink composition according to the present embodiment is an aqueous ink. Due to this, the polymer is easily dispersed in the form of an emulsion and it is possible to use the ink jet method to easily form an image having superior fixability and scratch resistance. The aqueous ink is an ink in which water is at least the main solvent and which includes 30% by mass or more of water.

The ink of the present embodiment may contain a silicone additive or a polyolefin wax as one of the other components. Due to this, it is possible to obtain superior abrasion resistance (scratch resistance) of the ink, which is preferable.

1.2.2. Silicone Additives

It is possible for a silicone additive to improve the scratch resistance of the ink. Examples of silicone additives include oil-type silicone and silicone emulsion (emulsion-type silicone). Specific examples of the silicone additive include dimethyl silicone (E). By containing the silicone additive, it is possible to particularly improve the scratch resistance of the polyurethane resin (U). In particular, a silicone emulsion is preferable in the above points. In addition, in the above points, containing at least one of a silicone emulsion and a polyolefin wax described below is preferable.

A description will be given below of the dimethyl silicone (E) as an example of the silicone additive.

Examples of the dimethyl silicone (E) include an oil-type dimethyl silicone (e1) and an emulsion-type dimethyl silicone (e2) in which (e1) is dispersed in an aqueous medium with a dispersant. The dimethyl silicones (E) may be used alone or in combination of two or more thereof.

Examples of commercially available products of the oil-type dimethyl silicone oil (e1) include SH200 series [produced by Toray Dow Corning Co., Ltd.], KF-96 series [produced by Shin-Etsu Chemical Co., Ltd.], TSF451 series [produced by Momentive Performance Materials Japan LLC], and the like.

Examples of commercially available products of the emulsion-type dimethyl silicone (e2) include SM8706EX, FSXE-2098, IE-7045, SM7036EX, IE7046T, and SM8701EX [produced by Toray Dow Corning Co., Ltd.], POLON MF-7, POLON MF-17, POLON MF-32, and POLON MF-33 [produced by Shin-Etsu Chemical Co., Ltd.] and TSM630, TSM631, TSM6344, and TSM6343 [produced by Momentive Performance Materials Japan], and the like.

Among the dimethyl silicones (E), from the viewpoint of the dispersion stability of the polyurethane resin aqueous dispersion (Q), (e2) is preferable. The dimethyl silicones (E) may be used alone or in combination of two or more thereof.

From the viewpoint of the adhesion and scratch resistance of the polyurethane resin (U), the amount of the dimethyl silicone (E) used is preferably 0.2% by weight to 15% by weight based on the weight of (U), more preferably 0.5% by weight to 10% by weight, and particularly preferably 1.0% by weight to 5% by weight.

Regarding the dimethyl silicone (E), when the polyurethane resin aqueous dispersion (Q) is produced, in a case in which the dimethyl silicone (E) is an oil-type dimethyl silicone oil (e1), a step of mixing (U) and (e1) before the polyurethane resin (U) or the urethane prepolymer (P) is dispersed in the aqueous medium and carrying out the dispersion in the aqueous medium may be performed. When (E) is an emulsion-type dimethyl silicone oil (e2), (e2) may be blended after the dispersion step of (U). Here, dimethyl silicone may be added in the preparation of the ink.

1.2.3. Polyolefin Wax

The ink of the present embodiment may contain a polyolefin-based wax agent. By containing a polyolefin-based wax agent, it is possible to further improve the scratch resistance, particularly the dry friction resistance, which is required for surface printing.

A specific description will be given of an olefin-based wax able to be used in the present disclosure.

The olefin-based wax is obtained by copolymerizing an olefin and a diene. Examples of olefins used for producing the olefin-based wax include ethylene and α-olefin having 3 to 12 carbon atoms. Examples of α-olefins having 3 to 12 carbon atoms include propylene, 1-butene, 1-pentene, 3-methyl-1-butene, 1-hexene, 4-methyl-1-pentene, 3-methyl-1-pentene, 1-octene, 1-decene, 1-dodecene, and the like. Among these, α-olefins having 3 to 10 carbon atoms are preferable, α-olefins having 3 to 8 carbon atoms are more preferable, and propylene, 1-butene, 1-hexene, and 4-methyl-1-pentene are particularly preferable.

Similarly, examples of dienes used for the production of the olefin-based wax include butadiene, isoprene, 4-methyl-1,3-pentadiene, 1,3-pentadiene, 1,4-pentadiene, 1,5-hexadiene, 1,4-hexadiene, 1,3-hexadiene, 1,3-octadien, 1,4-octadien, 1,5-octadien, 1,6-octadien, 1,7-octadien, ethylidene norbornene, vinylnorbornene (5-vinylbicyclo [2.2.1] hept-2-ene), dicyclopentadiene, 2-methyl-1,4-hexadiene, 2-methyl-1,6-octadiene, 7-methyl-1,6-octadiene, 4-ethylidene-8-methyl-1,7-nonadiene, 5,9-dimethyl-1,4,8-decatoriene, and the like. Among these, vinyl norbornene, ethylidene norbornene, dicyclopentadiene, 1,4-hexadiene, butadiene, isoprene, 2-methyl-1,4-hexadiene, or 2-methyl-1,6-octadien are preferable.

The ink jet ink composition of the present disclosure preferably has a polyolefin-based wax having a melting point of 85° C. to 120° C. and an average particle size of 140 nm or less.

In the present disclosure, using the specific polyolefin-based wax described above improves the scratch resistance, particularly the dry friction resistance.

Further, as a polyolefin-based wax able to be used in the present disclosure, there is an oxidized polyolefin-based wax obtained by oxidizing a polyolefin-based wax by a known method.

It is possible to produce the oxidized polyolefin-based wax, for example, by introducing an oxygen atom or the like into the molecule while adjusting the polymer polyolefin-based resin to a desired molecular weight by thermal decomposition, chemical decomposition, or the like. The oxygen atom introduced into the molecule forms, for example, a carboxyl group having polarity or the like. In the present disclosure, it is preferable to use an oxidized polyolefin-based wax in terms of being easily emulsifiable in an aqueous solvent.

In addition, in the present disclosure, it is preferable to contain at least one of paraffin wax and Sasol wax in terms of improving the wear resistance and having excellent gloss for printed matter. In the present disclosure, the paraffin wax is a wax formed of a mixture of chain saturated hydrocarbons having 20 or more carbon atoms. In addition, in the present disclosure, Sasol wax (Fischer-Tropsch wax) is a synthetic wax produced by a method of synthesizing hydrocarbons by a hydrogenation reaction of carbon monoxide using coal as a raw material, formed of saturated linearly linked hydrocarbons and having an almost perfect linear molecular structure having almost no branches.

In the present disclosure, a polyolefin-based wax having a melting point of 85° C. or higher is used in terms of improving the scratch resistance. Among these, in terms of further improving the scratch resistance, the melting point is preferably 90° C. or higher, and more preferably 95° C. or higher. On the other hand, in the present disclosure, the melting point of the polyolefin-based wax is 120° C. or lower. By setting the melting point of the polyolefin-based wax to 120° C. or lower, it is easy to adjust the average particle size of the wax emulsion to 140 nm or less, it is possible to suppress the amount of the surfactant used in preparing the emulsion, the dispersion stability of the wax emulsion is improved, and the water resistance and solvent resistance of the ink composition are improved.

In the present disclosure, the polyolefin-based wax is in an emulsion state in the ink composition. The method of forming the polyolefin-based wax into an emulsion is not particularly limited and may be appropriately selected from known methods in the related art. Examples thereof include a method of mixing a polyolefin-based wax, other waxes used as necessary, and a known surfactant, and the like. As the surfactant used for the polyolefin-based wax emulsion, a surfactant having a relatively high lipophilicity is preferable and, specifically, alkoxylates of a long-chain alcohol and salts thereof, polyoxyalkylene alkyl ethers and salts thereof, polyoxyalkylene fatty acid alcohol, glycerin fatty acid ester, sorbitan fatty acid ester, and the like are preferable.

In terms of the dispersion stability of the wax emulsion and the ink ejection property and the glossiness of the printed matter in the ink jet method being excellent, the average particle size of the polyolefin-based wax emulsion in the ink is preferably 200 nm or less, and more preferably 120 nm or less. On the other hand, in terms of improving the scratch resistance of the printed matter, particularly the dry friction resistance, the average particle size of the wax emulsion is preferably 30 nm or more.

In the ink composition for ink jet recording of the present disclosure, the total content ratio of the silicone emulsion or the polyolefin wax emulsion is not particularly limited; however, in terms of the stability, water resistance, and solvent resistance of the silicone emulsion or wax emulsion in the ink and of the fixability and scratch resistance of the printed matter, 0.05% or more and 5% or less relative to the total amount of the ink composition is preferable, and 0.1% or more and 3% or less is more preferable.

In addition, it is particularly preferable that the content of the polyolefin wax emulsion is in the range described above.

Examples of commercially available products of polyolefin wax include trade name "A-C8" (polyethylene wax) produced by Honeywell, trade name "VISCOWAX 122" (polyethylene wax) produced by INNOSPEC, trade name "A-C400" (ethylene-vinyl acetate copolymer-based wax) produced by Honeywell, trade name "VISCOWAX 334" (ethylene-vinyl acetate copolymer-based wax) produced by INNOSPEC, "VISCOWAX 343" (ethylene-vinyl acetate copolymer-based wax) produced by INNOSPEC, as polyethylene wax emulsions produced by Toho Chemical Industry Co., Ltd., E-4B, E103N, E-1000, E-5403B, E-6000, E-6314, E-6400, S-3121, S-3123, S-3125, and S-3148, as polypropylene-based wax emulsions, Hi-Tech E-433N, and Hi-Tech E-5060, as polyethylene wax emulsions produced by Rohm & Haas Japan Co., Ltd., PolyM 20 and PolyM 40J, as polyethylene wax produced by Mitsui Chemicals, Inc., Chemipearl W-100, W-200, W-300, W-308, W-310, W-400, W-401, W-410, W-500, WF-640, W-700, W-800, W-900, W-950, W-4005, and the like, polyolefin resins described in JP-A-2003-201436, AQUACER 1550, 497, 500 series, 840, 1000 series, 2500, 2650, 3500, 8075, and 8976 by BYK Chemie, S-323 S-363, S-368N5T, S-379, S-381, S-390C, S-394, S-395, S-395SD4, 5-400, S-483, NEPUUNE-1, NEPUUNE-5031, NEPUUNE-968, NEPUUNE-5223N4, NEPUUNE-5331, and NEPUUNE-5918 produced by Sherlock Technology (USA), carnauba wax emulsion WE-100 and carnauba wax emulsion WE-1-252 produced by Shinei Sangyo Co., Ltd., wax emulsion produced by Nikko Fine Products Co., Ltd., and the like.

1.2.4. Coloring Material

The ink jet ink composition of the present embodiment may contain a pigment, a dye, or the like as a coloring material. In the ink jet ink composition of the present embodiment, since it is possible to physically fix the coloring material to the recording medium by the resin (polymer) described above, a pigment is more preferable as the coloring material to be used. An image (recorded matter) is formed by attaching the pigment to the recording medium.

The pigment is not particularly limited and, as the pigment types, inorganic pigments such as carbon black, calcium carbonate, and titanium oxide, organic pigments such as azo pigments, isoindolinone pigments, diketopyrrolopyrrole pigments, phthalocyanine pigments, quinacridone pigments, and anthraquinone pigments, or the like may be used.

Example of black pigments include No. 2300, No. 900, MCF88, No. 33, No. 40, No. 45, No. 52, MA7, MA8, MA100, No. 2200B, and the like (the above are produced by Mitsubishi Chemical Corporation), Raven 5750, Raven 5250, Raven 5000, Raven 3500, Raven 1255, Raven 700, and the like (the above are produced by Columbia Carbon Co., Ltd.), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (the above are produced by Cabot), Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, and Special Black 4 (the above are produced by Degussa), and the like.

Examples of white pigments include C.I. Pigment White 1 (basic lead carbonate), 4 (zinc oxide), 5 (mixture of zinc sulfide and barium sulfate), 6 (titanium oxide), 6: (titanium oxide containing other metal oxides), 7 (zinc sulfide), 18 (calcium carbonate), 19 (clay), 20 (titanated mica), 21 (barium sulfate), 22 (natural barium sulfate), 23 (gloss white), 24 (alumina white), 25 (plaster), 26 (magnesium oxide/silicon oxide), 27 (silica), 28 (anhydrous calcium silicate), and the like.

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180, and the like.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), (Mn), 57 (Ca), 57: 1, 88, 112, 114, 122, 123, 144, 146, 149, 150, 166, 168, 170, 171, 175, 176, 177, 178, 179, 184, 185, 187, 202, 209, 219, 224, 245, and C.I. Pigment Violet 19, 23, 32, 33, 36, 38, 43, 50, and the like.

Examples of cyan pigments include C.I. Pigment Blue 1, 2, 3, 15, 15: 1, 15: 2, 15: 3, 15:34, 15: 4, 16, 18, 22, 25, 60, 65, 66, and C.I. Vat Blue 4, 60, and the like.

Examples of pigments other than black, white, yellow, magenta, and cyan include C.I. Pigment Green 7, 10, C.I. Pigment Brown 3, 5, 25, 26, and C.I. Pigment Orange 1, 2, 5, 7, 13, 14, 15, 16, 24, 34, 36, 38, 40, 43, 63, and the like.

It is possible to use the pigments exemplified above as at least one of a pigment (surface treatment pigment) in which an anionic group is bonded to the particle surface directly or via another atomic group and a pigment dispersed with a resin having an anionic functional group.

Examples of pigments in which anionic groups are bonded to the particle surface directly or via other atomic groups include pigments in which a functional group including an anionic group is bonded to the surface of the pigment particles, and pigments in which an anionic resin is bonded to the surface of the pigment particles. In addition, examples of the pigments dispersed with a resin having an anionic functional group include pigments in which the anionic resin is physically adsorbed on the surface of the pigment particles, pigments in which the pigment is included in the anionic resin, and the like.

A self-dispersing pigment in which a functional group including an anionic group is bonded to the surface of the pigment particles is formed by bonding anionic groups such as —COOM, —SO$_3$M, —PO$_3$HM, and —PO$_3$M$_2$ on the surface of the pigment particles directly or via other atomic groups. Examples of M include hydrogen atoms, lithium, sodium, potassium, and organic amines such as ammonium (NH$_4$), methylamine, ethylamine, monoethanolamine, diethanolamine, and triethanolamine. In addition, examples of other atomic groups include linear or branched alkylene groups having 1 to 12 carbon atoms, phenylene groups, naphthylene groups, amide groups, sulfonyl groups, amino groups, carbonyl groups, ester groups, ether groups, groups combining these groups, and the like.

These self-dispersing pigments include pigments in which an anionic group is bonded to the surface of pigment particles by an oxidation treatment by a known method and pigments in which functional groups including anionic groups such as diazo couplings are bonded to the surface of pigment particles and it is possible to suitably use any of the above. A self-dispersing pigment in which an anionic resin is bonded to the surface of pigment particles is formed by a resin having at least a unit having an anionic group as a hydrophilic unit bonding to the surface of the pigment particles directly or via other atomic groups.

Both a resin dispersion pigment in which an anionic resin is physically adsorbed on the surface of the pigment particles and a resin dispersion pigment in which the pigment is included in the anionic resin are obtained by a dispersion method in which a resin dispersant is used. As the resin dispersant, a copolymer having a hydrophilic group and a hydrophobic group is used.

As the resin dispersant used for the self-dispersing pigment and the resin dispersion pigment, it is possible to use any known resin able to be used for ink jet inks. As a suitable resin dispersant, the hydrophilic group preferably includes at least an anionic group. Examples of the hydrophilic group include groups formed of hydrophilic monomers such as (meth)acrylic acid and salts thereof. In addition, examples of the hydrophobic group include functional groups using a hydrophobic monomer such as styrene or derivatives thereof, monomers having an aromatic ring such as benzyl (meth)acrylate, monomers having an aliphatic group such as (meth)acrylic acid ester, or the like.

The resin used as a resin dispersant preferably has a weight average molecular weight of 1,000 or more and 100,000 or less, more preferably 3,000 or more and 80,000 or less, and an acid value of 50 mgKOH/g or more and 150 mgKOH/g or less is preferable. In the present disclosure, it is more preferable to use a styrene-(meth)acrylic-based resin or a (meth)acrylic-based resin with an acid value of 50 mgKOH/g or more and 150 mgKOH/g or less as a dispersant. When a dispersion method using a dispersant is used, the mass ratio of the resin dispersant/pigment is preferably 0.1 times or more and 10.0 times or less, and more preferably 0.5 times or more and 5.0 times or less.

It is possible for the ink jet ink composition of the present embodiment to have a white ink containing a white coloring material as the coloring material. It is possible to record a white layer on a recording medium with white ink and to obtain a white layer having excellent shielding properties. When an image (non-white image) is recorded with a non-white ink containing a non-white coloring material on a recording medium such as a transparent or translucent film as an ink attachment target, by using the white layer recorded with the white ink as the background of the image, it is possible to improve the visibility of the image, which is preferable. According to the present embodiment, it is possible to form a white layer having excellent fixability and scratch resistance and to create recorded matter having good abrasion resistance and the like using this layer.

As the white coloring material, it is possible to use a white dye, pigment, or the like and to use the white pigment described above or the like. As the non-white coloring material, it is possible to use a coloring material having a color other than white described above.

A plurality of these exemplified pigments may be used. The total content of the pigments (solid content) in the ink jet ink composition varies depending on the pigment types used, but from the viewpoint of obtaining good color development, when the total mass of the ink jet ink composition is 100% by mass, in the case of a color ink, 0.1% by mass or more and 15.0% by mass or less is preferable, and 1.0% by mass or more and 10.0% by mass or less is more preferable. In the case of a white ink, 0.1% by mass or more and 30.0% by mass or less is preferable, and 1.0% by mass or more and 20.0% by mass or less is more preferable. Further, 10.0% by mass or more and 20.0% by mass or less is preferable.

When preparing an ink jet ink composition, a pigment dispersion liquid in which a pigment is dispersed may be prepared in advance and the pigment dispersion liquid may be added to the ink jet ink composition. As a method for obtaining such a pigment dispersion liquid, there are a method of dispersing a self-dispersing pigment in a dispersion medium without using a dispersant, a method of dispersing a pigment in a dispersion medium using a polymer dispersant (resin dispersant), a method of dispersing a surface-treated pigment in a dispersion medium, and the like.

1.2.5. Organic Solvent

The ink jet ink composition of the present embodiment may include an organic solvent. Including the organic solvent makes it possible to effectively suppress the evaporation of water from a recording head when left for a long period of time while making the ejection stability of the ink jet ink composition by the ink jet method excellent. In addition, the permeability and the like of the ink are improved and it is possible to obtain an image having excellent image quality, abrasion resistance, adhesion, and the like. As the organic solvent, a water-soluble organic solvent is preferable. Below, the organic solvent is also referred to as a water-soluble organic solvent.

Examples of the water-soluble organic solvent include polyhydric alcohols, glycol ethers, nitrogen-containing solvents, esters, cyclic esters, and the like. In particular, polyhydric alcohols, glycol ethers, and nitrogen-containing solvents are preferable.

Polyhydric alcohols are organic solvents having two or more hydroxyl groups in the molecule. Examples of polyhydric alcohols include polyols and alkanediols.

The polyhydric alcohols are preferably included in the ink as 1% by mass to 40% by mass, more preferably 2% by mass to 30% by mass, and even more preferably 5% by mass to 20% by mass.

Preferable examples of polyols include alkanes having 2 or more hydroxyl groups and having 4 or fewer carbon atoms, condensates in which alkanes having 2 or more hydroxyl groups and having 4 or fewer carbon atoms are intermolecularly condensed with each other by the hydroxyl groups, and the like. For the condensates, the number of condensations is preferably 2 to 4. The polyols are compounds having two or more hydroxyl groups in the molecule and the number of hydroxyl groups is preferably 2 to 5, and more preferably 2 to 3.

Polyols have an excellent action as a moisturizer, which is preferable. Examples of the polyols include ethylene glycol, propylene glycol, 1,2-propanediol, 1,2-butanediol, 1,3-propanediol, 1,4-butanediol, diethylene glycol, triethylene glycol, dipropylene glycol, trimethylolpropane, glycerin, and the like. It is possible to use the polyols alone or as a mixture of two or more thereof. The polyols are preferably included in the ink as 1% by mass to 40% by mass, more preferably 2% by mass to 30% by mass, and even more preferably 5% by mass to 20% by mass.

Preferable examples of alkanediols include alkanediols having 5 or more carbon atoms. The number of carbon atoms of the alkanediols is more preferably 5 to 15, even more preferably 5 to 10, and particularly preferably 6 to 9. The alkanes may be linear or branched. It is possible to use these alone or as a mixture of two or more thereof. Alkanediols are excellent in the action of increasing the wettability of the ink composition with respect to the recording medium for uniform wetting, and the action as a penetrating solvent with respect to the recording medium. In particular, 1,2-alkanediols have an excellent action as a penetrating solvent, which is preferable.

Examples of alkanediols include 1,2-pentanediol, 1,2-hexanediol, 1,2-octanediol, 1,6-hexanediol, 2-methyl-2,4-pentanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, and the like.

Alkanediols are preferably included in the ink as 0.1% by mass to 10% by mass, more preferably 0.5% by mass to 8% by mass, and even more preferably 1% by mass to 5% by mass.

The nitrogen-containing solvent may be any solvent including a nitrogen atom in the molecule. The nitrogen-containing solvent acts as a good resin dissolving agent and is able to obtain recorded matter having excellent abrasion resistance and adhesion, which is preferable. It is possible to use the solvents alone or as a mixture of two or more thereof. Examples of the nitrogen-containing solvent include dimethyl sulfoxide, amides, and the like.

Examples of preferable amides include cyclic amides and acyclic amides.

Examples of cyclic amides include pyrrolidones, and the like. Examples thereof include N-methyl-2-pyrrolidone, N-ethyl-2-pyrrolidone, 2-pyrrolidone, N-vinyl-2-pyrrolidone, N-butyl-2-pyrrolidone, 5-methyl-2-pyrrolidone, and the like.

The acyclic amides may be any amide having an acyclic structure. In particular, acyclic amides have excellent resin solubility and excellent recorded matter abrasion resistance, which is preferable. Examples of acyclic amides include alkyl amides, and the like. Among the alkyl amides, in particular, alkoxyalkyl amides have excellent abrasion resistance, which is preferable.

Examples of acyclic amides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methyl ethyl propionamide, and the like.

The nitrogen-containing solvent is preferably included in the ink as 1% by mass to 40% by mass, more preferably 2% by mass to 30% by mass, even more preferably 3% by mass to 20% by mass, and particularly preferably 5% by mass to 10% by mass.

The glycol ethers may be monoethers or diethers of alkylene glycols (also including intermolecular condensates of the hydroxyl groups thereof). As the alkylene glycol, a condensate having 4 or fewer carbon atoms or in which these are subjected to intermolecular condensation between hydroxyl groups is preferable. In the case of a condensate, the number of condensations is preferably 2 to 4.

Examples of the ethers include alkyl ethers, aromatic ethers, and the like and alkyl ethers are preferable. The alkyl of the alkyl ether preferably has 1 to 4 carbon atoms.

Glycol ethers are preferable in terms of having excellent resin solubility, excellent recorded matter abrasion resistance and adhesion, and in terms of excellent permeability and excellent image quality. In particular, monoethers are preferable.

Glycol ethers preferably have 15 or fewer carbon atoms in the molecule, and more preferably 8 or less. In addition, 3 to 12 is preferable, 4 to 8 is more preferable, and 4 to 7 is even more preferable. In this case, the abrasion resistance and adhesion are superior, which is preferable.

Examples of glycol ethers include ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, dipropylene glycol monobutyl ether, 3-methoxy-3-methyl-1-butanol, ethylene glycol dimethyl ether, ethylene glycol diethyl ether, ethylene glycol dibutyl ether, diethylene glycol dimethyl ether, diethylene glycol diethyl ether, and the like.

Glycol ethers are preferably included in the ink as 1% by mass to 40% by mass, more preferably 2% by mass to 30% by mass, even more preferably 3% by mass to 20% by mass, and particularly preferably 5% by mass to 10% by mass.

In addition, the total content of the nitrogen-containing solvent and glycol ethers in the ink is also preferably within the above range.

Esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

Cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone, and compounds thereof in which the hydrogen of the methylene group adjacent to the carbonyl group thereof is substituted with an alkyl group having 1 to 4 carbon atoms.

The content of the organic solvent is preferably 1% by mass or more relative to the total mass of the ink composition, more preferably 5% by mass or more, and even more preferably 10% by mass or more. On the other hand, the content of the organic solvent is preferably 50% by mass or less relative to the total mass of the ink composition, more preferably 40% by mass or less, and even more preferably 30% by mass or less. In a case of the above range, abrasion resistance, adhesion, moisture retention, permeability, and the like are superior, which is preferable.

The standard boiling point of the organic solvent is preferably 160° C. or higher, more preferably 200° C. or higher, and even more preferably 210° C. or higher. On the other hand, the standard boiling point of the organic solvent is preferably 300° C. or lower, preferably 280° C. or lower, more preferably 270° C. or lower, and even more preferably 260° C. Further, the standard boiling point may be 210° C. or lower, or may be 190° C. or lower.

When the standard boiling point of the organic solvent is the above range or higher, the ejection stability and the like of the ink composition are superior, while in a case of being the above range or lower, the adhesion, abrasion resistance, and the like are superior, which is preferable. In particular, the standard boiling point of polyhydric alcohols is preferably in the above range.

Here, polyols having a standard boiling point of higher than 280° C. such as glycerin may significantly reduce the drying property of the ink when attached to the recording medium. Therefore, the content of polyols having a standard boiling point of higher than 280° C. in the ink composition is preferably 3% by mass or less relative to the total mass of the ink composition, more preferably 2% by mass or less, even more preferably 1% by mass or less, yet more preferably 0.5% by mass or less, and particularly preferably 0.1% by mass or less. In such a case, since the ink composition has a superior drying property on the recording medium, the abrasion resistance and adhesion are superior, which is preferable.

Furthermore, in the ink composition, the content of the organic solvent having a standard boiling point of higher than 280° C. being in the above range is also more preferable in terms of the above points. Here, the organic solvent having a standard boiling point of higher than 280° C. is not limited to the polyols described above.

1.2.6. Surfactant

The ink jet ink composition of the present embodiment may include a surfactant. As the surfactant, it is possible to use any of a nonionic surfactant, an anionic surfactant, a cationic surfactant, and an amphoteric surfactant, and the above may be used in combination. In particular, silicone-based surfactants, acetylene glycol-based surfactants, and fluorine-based surfactants are preferable. More specific examples of the surfactant include the below examples and the like.

Acetylene glycol-based surfactants; acetylene alcohol-based surfactant; ether-based surfactants such as polyoxyethylene nonylphenyl ether, polyoxyethylene octylphenyl ether, polyoxyethylene dodecylphenyl ether, polyoxyethylene alkyl allyl ether, polyoxyethylene oleyl ether, polyoxyethylene lauryl ether, polyoxyethylene alkyl ether, and polyoxyalkylene alkyl ether; ester-based surfactants such as polyoxyethylene oleic acid, polyoxyethylene oleic acid ester, polyoxyethylene distearic acid ester, sorbitan laurate, sorbitan monostearate, sorbitan monooleate, sorbitan sesquiolate, polyoxyethylene monooleate, and polyoxyethylene stearate; silicon-based surfactants such as dimethylpolysiloxane; fluorine-based surfactants such as fluorine alkyl esters and perfluoroalkyl carboxylics acid salts. The surfactants may be used alone or in combination of two or more thereof.

When a surfactant is blended in the ink jet ink composition, the total amount of the surfactant is blended as 0.01% by mass or more and 3% by mass or less relative to the entire ink jet ink composition, preferably 0.05% by mass or more and 2% by mass or less, more preferably 0.1% by mass or more and 1% by mass or less, and particularly preferably 0.2% by mass or more and 0.5% by mass or less.

Since the ink jet ink composition contains a surfactant, the stability when ejecting ink from the head tends to increase.

1.2.7. Chelating Agent

The ink jet ink composition of the present embodiment may include a chelating agent. The chelating agent has a property of capturing ions. Examples of such a chelating agent include ethylenediaminetetraacetate (EDTA), nitrilotriacetate of ethylenediamine, hexametaphosphate, pyrophosphate, metaphosphate, and the like.

1.2.8. Preservative

The ink jet ink composition of the present embodiment may contain a preservative. By containing the preservative, it is possible to suppress the growth of mold and bacteria and the storage stability of the ink composition is improved. Due to this, for example, using the ink jet ink composition as a maintenance liquid is easier during long-term maintenance during which the printer is not used. Preferable examples of the preservative include Proxel CRL, Proxel BDN, Proxel GXL, Proxel XL-2, Proxel IB, Proxel TN, and the like.

1.2.9. pH Adjuster

The ink jet ink composition of the present embodiment may contain a pH adjuster. By containing a pH adjuster, for example, it is possible to suppress or promote the elution of impurities from the member forming the ink flow path and to adjust the cleaning property of the ink jet ink composition. Examples of pH adjusters include morpholine, piperazines, and amino alcohols, such as triethanolamine.

1.2.10. Other Components

The ink jet ink composition according to the present embodiment may further contain a water-soluble organic compound which is solid at room temperature, such as polyhydric alcohols such as trimethylolpropane and trimethylolethane, or urea derivatives such as urea and ethyleneurea, as necessary. Furthermore, as necessary, various additives may be contained, such as rust preventives, fungicides, antioxidants, reduction inhibitors, evaporation promoting agents, and water-soluble resins.

2. Recording Method

2.1. Recording Medium

The recording method according to the present embodiment is used as a recording method for performing recording on a recording medium using an ink jet ink composition. A description will be given below of an example of a recording medium used together with the recording method according to the present embodiment.

The recording medium used in the recording method of the present embodiment is not particularly limited, but a low-absorbent or non-absorbent recording medium is preferable. The low-absorbent or non-absorbent recording medium refers to a recording medium having the property of not absorbing ink at all or hardly absorbing ink. Quantitatively, the recording medium used in the present embodiment refers to "a recording medium having a water absorption amount of 10 mL/m$^2$ or less from the start of contact to 30 msec$^{1/2}$ thereafter in the Bristow method". This Bristow method is the most widely used method as a method for measuring amounts of liquid absorbed in a short time and is also adopted by the Japan Technical Association of Pulp and Paper Industry (JAPAN TAPPI). The details of the test method are described in standard No. 51 "Paper and Paperboard-Liquid Absorption Test Method-Bristow Method" of "JAPAN TAPPI Pulp and Paper Test Methods, 2000 Edition". Examples of recording media provided with such a non-absorbent property include recording media in which an ink receiving layer having ink absorbency is not provided on the recording surface and recording media provided with a coat layer having low ink absorbency on a recording surface.

The non-absorbent recording medium is not particularly limited and examples thereof include a plastic film having no ink absorbing layer, a medium in which a plastic is coated on a base material such as paper, a medium to which a plastic film is attached, or the like. Examples of the plastic referred to here include polyvinyl chloride, polyethylene terephthalate, polycarbonate, polystyrene, polyurethane, polyethylene, polypropylene, and the like.

The low-absorbent recording medium is not particularly limited and examples thereof include coated paper provided with a coating layer on the surface for receiving oil-based ink. The coated paper is not particularly limited and examples thereof include printed paper such as art paper, coated paper, and matte paper.

When using the ink jet ink composition of the present embodiment, it is possible to record recorded matter having excellent adhesion and abrasion resistance even on a non-ink absorbent or low-ink absorbent recording medium.

Examples of non-absorbent recording media include polar base materials and low-polar base materials. As for the polar base material, the material forming the surface of the base material has comparatively high polarity and examples thereof include PET, nylon, ABS, polycarbonate, and the like.

In a low-polar base material, the material forming the surface of the base material has comparatively little or no polarity and examples thereof include polyolefins such as OPP and PE, and the like.

All the above are easily available as film-based base materials and the base materials have excellent flexibility and durability and are useful as packaging materials, bulletin boards, and the like.

For the polar base material and the low-polar base material, due to the difference in polarity, there may be differences in the manner of obtaining adhesion and abrasion resistance when attaching the ink, depending on the ink components. That is, depending on the components of the ink, there are inks with which the characteristics of the recorded matter are more easily obtained with the polar base material and inks with which the characteristics of the recorded matter are more easily obtained with the low-polar base material. In this case, it is difficult to obtain excellent characteristics for both base materials of the polar base materials and the low-polar base materials at the same time. However, with the ink of the present embodiment, it is possible to obtain excellent adhesion, abrasion resistance, and the like with respect to both polar base materials and low-polar base materials, which is preferable.

The ink composition of the present embodiment may be an ink composition used for recording on a non-absorbent recording medium, which is preferable. In addition, the ink composition of the present embodiment may be an ink composition used for recording on a polar base material and recording on a low-polar base material, which is preferable.

2.2. Recording Method

The ink jet ink composition described above is used in the recording method according to the present embodiment. According to such a recording method, for example, when an ink jet ink composition is ejected from an ink jet head onto a recording medium and attached to a recording medium (attaching step) to form an image layer, it is possible to obtain an image with excellent adhesion, abrasion resistance, and the like.

The recording method of the present embodiment is a method of ejecting the ink jet ink composition of the present embodiment described above from a recording head for an ink jet method to record an image on a recording medium. Examples of the method of ejecting ink include a method of applying mechanical energy to an ink through an electrostrictive element and a method of applying thermal energy to an ink. In the present embodiment, it is particularly preferable to use a method of applying mechanical energy to an ink through an electrostrictive element. In such a case, not using thermal energy makes it possible for components such as the resin of the ink to be stably present in the recording head, which is preferable.

It is possible for the recording method of the present embodiment to be a recording method in which the recording medium to which the ink is attached is the recording medium described above, which is preferable in terms of the points described above. The recording medium described above is generally a recording medium to which attachment is difficult; however, since it is possible to form an image having good fixability thereon, the abrasion resistance, adhesion, and the like are excellent, which is preferable.

In addition, it is possible for the recording method of the present embodiment to be a recording method for performing recording using a recording apparatus capable of recording on a polar base material and recording on a low-polar base material as described above, which is preferable in terms of the points described above.

2.3. Recording Apparatus

Further description will be given of the recording method of the present embodiment with an ink jet recording apparatus as an example of a recording apparatus which performs the recording method of the present embodiment. FIGURE is a side surface view showing an overall outline of an ink jet recording apparatus 1 which is an example of a recording apparatus used in the recording method of the present embodiment.

As shown in FIGURE, the ink jet recording apparatus 1 includes a recording medium feeding unit 10, a transport unit 20, a recording unit 30, a drying unit 90, a drying device 100, and a discharging unit 70.

The feeding unit 10 feeds a roll-shaped recording medium F, which is an example of a recording medium, to the transport unit 20. Specifically, the feeding unit 10 has a roll medium holder 11 and the roll medium holder 11 holds the roll-shaped recording medium F. By rotating the roll-shaped recording medium F, the recording medium F is fed to the transport unit 20 downstream in a feed direction Y.

The transport unit 20 transports the recording medium F sent from the feeding unit 10 to the recording unit 30. Specifically, the transport unit 20 has a first feed roller 21 and further transports the sent recording medium F to the recording unit 30 downstream in the feed direction Y.

The recording unit 30 carries out recording by ejecting and attaching the ink composition onto the recording medium F sent from the transport unit 20. The recording unit 30 is provided with a plurality of ink jet heads and is also able to eject a plurality of types of ink. In FIGURE, seven ink jet heads are provided; however, one or more ink jet heads may be provided. A platen 35 is a unit for supporting the recording medium F from the back surface thereof.

FIGURE shows a line ink jet head having a length equal to or greater than the recording width of the recording medium F in the width direction X. Then, a one-pass recording method (line recording method) is performed in which the ink jet head does not move during recording and recording is performed by performing one scan in which, while transporting the recording medium F in the Y direction, a treatment liquid or an ink composition is ejected from each attaching portion to be attached to the recording medium F.

The ink jet recording apparatus 1 may be a serial printer in which a scan (main scan) is performed in which, while the ink jet type ink jet head moves in the front-back direction of FIGURE, that is, in the width direction X of the recording medium F, an ink composition or a treatment liquid is ejected and attached to the recording medium F facing the ink jet head.

A second feed roller 43 is provided downstream of the platen 35 in the feed direction Y. The second feed roller 43 sends the recorded recording medium F to a second drying unit 50 downstream in the feed direction Y.

The drying unit 90 is provided with a first drying unit 40 and the second drying unit 50. The first drying unit 40 carries out primary drying of the treatment liquid and the ink composition attached to the recording medium F. Examples of the first drying unit 40 include an infrared heater or a heat conductive heating unit such as a nichrome wire. Other than the above, the first drying unit 40 may be an apparatus which radiates radiation or an apparatus which blows warm air.

The second drying unit 50 further heats and dries the recording medium to which the ink is attached. As the second drying unit 50, for example, it is possible to use a blowing mechanism (not shown) which blows air to the recording medium F, a heat transfer mechanism which transfers heat to the recording medium F from a support portion by heating the support portion which has a surface in contact with the recording medium F along which the recording medium is transported, a radiation irradiation mechanism such as an infrared heater which radiates infrared rays to the recording medium F to heat the recording medium, and the like. A third feed roller 65 is provided in the vicinity of an outlet 64 of the second drying unit 50. The third feed roller 65 is arranged so as to be in contact with the back surface of the recording medium F and sends the recording medium F to the discharging unit 70 downstream in the feed direction Y.

The discharging unit 70 further sends the recording medium F sent from the second drying unit 50 to the downstream in the feed direction Y and discharges the recording medium F to the outside of the ink jet recording apparatus 1. Specifically, the discharging unit 70 is provided with a fourth feed roller 71, a fifth feed roller 72, a sixth feed roller 73, a seventh feed roller 74, and a take-up roller 75. The fourth feed roller 71 and the fifth feed roller 72 are arranged so as to be in contact with the surface of the recording medium F. The sixth feed roller 73 and the seventh feed roller 74 are arranged so as to form a roller pair. The recording medium F discharged by the sixth feed roller 73 and the seventh feed roller 74 is taken up by the take-up roller 75.

The ink jet recording apparatus 1 further provided with a control unit (not shown). The control unit controls the recording medium feeding unit 10, the transport unit 20, the recording unit 30, the drying unit 90, the drying device 100, the discharging unit 70, and the like when the ink jet recording apparatus 1 performs recording.

During recording, the upper limit of the surface temperature of the recording medium F in the region facing the ink jet head is preferably 50° C. or lower, and more preferably 45° C. or lower. In addition, the temperature is preferably 25° C. or higher, more preferably 30° C. or higher, even more preferably 35° C. or higher, and particularly preferably 40° C. or higher. As a result, since there is little or no radiant heat received from the drying unit or the drying device, it is possible to suppress drying and composition fluctuations of the ink composition and the treatment liquid in the ink jet head, to fix the ink quickly by heating, and to improve the image quality.

The temperature described above is the maximum temperature of the surface temperature of the portion of the recording medium F facing the ink jet head during recording. When the primary drying is performed by the first drying unit 40, the temperature is the temperature of the primary drying. When the primary drying is not performed, the temperature is the temperature at the periphery of the recording medium in the portion facing the ink jet head.

The second drying unit 50 is a heater for drying and solidifying the ink attached to the recording medium F, that is, for secondary heating or secondary drying. The second drying unit 50 heats the recording medium F on which the image is recorded such that the water or the like included in the ink evaporates and scatters more quickly and an ink film is formed by the resin included in the ink. In this manner, the ink film is firmly fixed or attached to the recording medium F to have excellent film-forming properties and an excellent high-quality image is obtained in a short time. The upper limit of the surface temperature of the recording medium F by the second drying unit 50 is preferably 120° C. or lower, more preferably 100° C. or lower, and even more preferably 90° C. or lower. In addition, the lower limit of the surface temperature of the recording medium F is preferably 60° C. or higher, more preferably 70° C. or higher, and even more preferably 80° C. or higher. The temperature being in the above range makes it possible to obtain a high-quality image in a short time. The temperature described above is the maximum temperature of the surface of the recording medium F in the secondary drying.

Regarding the ink attachment amount in the recording, the attachment amount per unit of area in the region where the ink is attached to the recording medium is preferably 0.1 mg/inch$^2$ or more, more preferably 1 mg/inch$^2$ or more, even more preferably 2 mg/inch$^2$ or more, particularly preferably 3 mg/inch$^2$ or more, and yet more preferably 5 mg/inch$^2$ or more. On the other hand, the attachment amount is preferably 20 mg/inch$^2$ or less, more preferably 15 mg/inch$^2$ or less, even more preferably 10 mg/inch$^2$ or less, and particularly preferably 7 mg/inch$^2$ or less. When two or more inks are overlapped and recorded, the attachment amount described above is the total attachment amount of two or more inks overlapped and recorded. When the attachment amount is within the range described above, the visibility of the image is excellent, and the adhesion, abrasion resistance, and the like are superior, which is preferable.

In addition, regarding the ink attachment amount in the recording, the maximum attachment amount per unit of area in the region where the ink is attached to the recording medium may be in the above range, which is preferable.

2.4. White Ink Recording Method

The recording method may be a recording method using the white ink described above. In such a case, for example, white ink may be ejected from one of the ink jet heads of FIGURE and attached to the recording medium and non-white ink may be ejected from another ink jet head and attached to the recording medium.

In such a case, a non-white ink layer (image) may be attached with respect to the white ink layer attached to the recording medium. Alternatively, when the recording medium is transparent, the white ink layer may be attached with respect to a non-white ink layer attached to the recording medium.

3. Ink Set

The ink set of the present embodiment is an ink set provided with two or more inks and at least one of the inks is the ink of the present embodiment described above. Among the inks provided in the ink set, there may be two or more inks of the present embodiment described above. The ink included in the ink set may be a white ink or a non-white ink. Among these, the white ink may be the ink of the present embodiment described above, the non-white ink may be the ink of the present embodiment described above, and the white ink and the non-white ink may be the ink of the present embodiment described above. Such cases are preferable in terms of the points described above.

4. Examples and Comparative Examples

A description will be given below of the present disclosure in more detail with reference to Examples and Comparative Examples, but the present disclosure is able to be modified in various ways without departing from the spirit thereof and is not limited by the Examples below.

4.1. Polyurethane Resin Dispersion

A description will be given of a production example of a polyurethane resin dispersion. Below, parts represent parts by mass. First, as a Production Example below, a polyester polyol used for producing a polyurethane resin dispersion was produced.

Production Example (a11-1)

1000 parts of polyolefin [trade name "Vistamaxx3980", produced by Exxonmobil] with 94% by weight of propylene and 6% by weight of ethylene as constituent monomers were added to a reaction container, heated and melted with a mantle heater while carrying out nitrogen aeration in the liquid phase, heat-decomposition was carried out under conditions of 370° C. and 90 minutes while stirring, and a polyolefin was obtained. Here, 20 parts of maleic anhydride were added thereto, subjected to nitrogen substitution, then uniformly dissolved by heating and raising the temperature to 180° C. under nitrogen aeration, a solution in which 5 parts of a radical initiator [dicumyl peroxide, trade name "Percumyl D", produced by NOF Corporation] were dissolved in 50 parts of xylene was added dropwise over 5 minutes, and then stirring was continued for 1 hour under xylene reflux. Then, unreacted maleic anhydride was distilled off under reduced pressure (1.5 kPa) to obtain an acid-modified polyolefin. In a similar reaction container, 500 parts of acid-modified polyolefin and 32 parts of 2-aminoethanol were added thereto and reacted at 180° C. for 1 hour in a nitrogen gas atmosphere. Next, unreacted 2-aminoethanol was distilled off at 180° C. under a reduced pressure of 2.7 kPa to obtain a hydroxyl group-modified polyolefin (a11-1). The hydroxyl value of (a11-1) was 25 and the Mn was 4,500.

Production Example 1

770 parts of terephthalic acid, 880 parts of 1,2-prepyrene glycol, and 0.5 parts of tetrabutoxytitanate as a polymerization catalyst were added to a reaction container provided with a stirrer, a cooling tube, a nitrogen introduction tube, and a thermometer, a reaction was carried out for 5 hours while distilling off water and 1,2-prepyrene glycol generated under a nitrogen stream at 210° C., and then a reaction was carried out under a reduced pressure of 5 to 20 mmHg for 1 hour. The obtained resin was cooled to room temperature and then pulverized to obtain 1000 parts of a polyester polyol (a12-1) including 76% by weight of the constituent unit represented by Chemical Formula (3) based on the weight of the polyol. The Mn of (a12-1) was 1500.

Production Example 2

498 parts of terephthalic acid, 263 parts of adipic acid, 1400 parts of 3-methyl-1,5-pentanediol, and 0.5 parts of tetrabutoxytitanate as a polymerization catalyst were added to a reaction container provided with a stirrer, a cooling tube, a nitrogen introduction tube, and a thermometer, a reaction was carried out for 5 hours while distilling off water and 3-methyl-1,5-pentanediol generated under a nitrogen stream at 210° C., and then a reaction was carried out under a reduced pressure of 5 to 20 mmHg for 1 hour. The obtained resin was cooled to room temperature and then pulverized to obtain 1000 parts of a polyester polyol (a12-2) including 49% by weight of the constituent unit represented by Chemical Formula (3) based on the weight of the polyol. The Mn of (a12-2) was 1500.

Next, a polyurethane resin aqueous dispersion, which is a production example of a polyurethane resin dispersion, was produced.

Polyurethane Resin Aqueous Dispersion Q-1

161.6 parts of NISSO-PBGI-2000 [produced by Nippon Soda Co., Ltd.] as (a11), 13.2 parts of neopentyl glycol as (a2), 14.6 parts of 2,2-dimethylol propionic acid as (a3), 99.9 parts of IPDI as an organic polyisocyanate component (B), 0.07 parts of Neostann U-600 [produced by Nitto Kasei Co., Ltd.] as a urethanization catalyst, and 150.0 parts of methyl ethyl ketone as an organic solvent for reaction were added to a simple pressurizing reaction device provided with a stirrer and a heating device and stirred at 80° C. for 6 hours to carry out a urethanization reaction and obtain a methyl ethyl ketone solution of the urethane prepolymer (P1) having an isocyanate group. Further, 60.6 parts of (a12-1) obtained in Production Example 1 were added to the obtained urethane prepolymer (P1), stirred at 80° C. for 4 hours to carry out a urethanization reaction, and a methyl ethyl ketone solution of the urethane prepolymer (P2) having an isocyanate group was produced. Next, 8.3 parts of triethylamine as a neutralizing agent and 74.2 parts of methyl ethyl ketone as an organic solvent for dilution were added to the obtained methyl ethyl ketone solution of the urethane prepolymer (P2) and made uniform, then 485.4 parts of water as the chain extender (a4) other than (a2) and an aqueous medium were added while stirring at 200 rpm and the polyurethane prepolymer was dispersed in water. The obtained dispersion was heated to 50° C. and stirred for 4 hours to carry out an extension reaction with water and further heated to 60° C. under reduced pressure to distill off the methyl ethyl ketone. Then, after cooling the obtained dispersion to room temperature, 23.6 parts of SM8706EX [solid content concentration 37% by weight, produced by Toray Dow Corning Co., Ltd.] as the dimethyl silicone (E) were added thereto and made uniform, water was added thereto to prepare the solid content concentration to be 30% by weight and thereby obtain a polyurethane resin aqueous dispersion (Q-1).

Polyurethane Resin Aqueous Dispersions Q-2 to Q-11

Polyurethane resin aqueous dispersions (Q-2) to (Q-11) were obtained in the same manner as in Q-1 except that the raw materials used and the amounts used were changed as shown in Table 1.

Polyurethane Resin Aqueous Dispersion Q-12

161.6 parts of NISSO-PBGI-2000 [produced by Nippon Soda Co., Ltd.] as (a11), 60.6 parts of (a12-1) obtained in Production Example 1, 13.2 parts of neopentyl glycol as (a2), 14.6 parts of 2,2-dimethylol propionic acid as (a3), 99.9 parts of IPDI as an organic polyisocyanate component (B), 0. 07 parts of Neostann U-600 [produced by Nitto Kasei Co., Ltd.] as a urethanization catalyst, and 150.0 parts of methyl ethyl ketone as an organic solvent for reaction were added to a simple pressurizing reaction device provided with a stirrer and a heating device and stirred at 80° C. for 6 hours to carry out a urethanization reaction and obtain a methyl ethyl ketone solution of a urethane prepolymer (P) having an isocyanate group. Next, 8.3 parts of triethylamine as a neutralizing agent, 74.2 parts of methyl ethyl ketone as an organic solvent for dilution, and 35.0 parts of Naroacty CL120 [produced by Sanyo Chemical Industries, Ltd.] as a dispersant were added to the obtained methyl ethyl ketone solution of the urethane prepolymer (P) and made uniform, then 485.4 parts of water as the chain extender (a4) other than (a2) and an aqueous medium were added while stirring at 200 rpm and the polyurethane prepolymer was dispersed in water. The obtained dispersion was heated to 50° C. and stirred for 4 hours to carry out an extension reaction with water and further heated to 60° C. under reduced pressure to distill off the methyl ethyl ketone. Then, after cooling the obtained dispersion to room temperature, 23.6 parts of SM8706EX [solid content concentration 37% by weight, produced by Toray Dow Corning Co., Ltd.] as the dimethyl silicone (E) was added thereto and made uniform, water was added thereto to prepare the solid content concentration to be 30% by weight and thereby obtain a polyurethane resin aqueous dispersion (Q-12).

Other Polyurethane Resin Aqueous Dispersions Q'-1, Q'-2

Polyurethane resin aqueous dispersions (Q'-1) and (Q'-2) were obtained in the same manner as in Example 1 except that the raw materials used and the amounts used were changed as shown in Table 1.

The composition of each raw material in Table 1 is as follows.

NISSO-PB GI-2000: Mn=2000 hydrogenated polybutadiene diol [produced by Nippon Soda Co., Ltd.]; having a constituent unit in which R1 in General Formula (1) is an ethyl group.

NISSO-PB G-2000: Mn=1900 polybutadiene diol [produced by Nippon Soda Co., Ltd.]; having a constituent unit in which R1 in General Formula (1) is a vinyl group.

Kuraray polyol β-2020: Mn=2000 poly 3-methyl-pentamethylene terephthalate [produced by Kuraray Co., Ltd.]; having a constituent unit represented by General Formula (3).

Kuraray polyol β-2010: Mn=2000 poly 3-methyl-pentamethylene adipate [produced by Kuraray Co., Ltd.]

Sannix PP-2000: Mn=2000 polyoxypropylene diol [produced by Sanyo Chemical Industries, Ltd.]

Ymer N120: Mn=1,000 polyoxyethylene polyol [produced by Perstorp]

PTMG2000: Mn=2,000 polytetramethylene ether glycol [produced by Mitsubishi Chemical Corporation]

SM8706EX: Aqueous emulsion of dimethyl silicone (solid content concentration 37% by weight) [produced by Toray Dow Corning Co., Ltd.]

POLON MF-32: Aqueous emulsion of dimethyl silicone (solid content concentration 31% by weight) [produced by Shin-Etsu Chemical Co., Ltd.]

Neostan U-600: Bismuthtris(2-ethylhexanoate) [produced by Nitto Kasei Co., Ltd.]

Naroacty CL120: Polyoxyalkylene alkyl ether [produced by Sanyo Chemical Industries, Ltd.]

TABLE 1

| Reference of polyurethane resin aqueous dispersion (Q) | | | | Q-1 | Q-2 | Q-3 | Q-4 | Q-5 | Q-6 | Q-7 |
|---|---|---|---|---|---|---|---|---|---|---|
| Raw material for prepolymer production (parts) | Mn 500 or more high-molecular-weight polyol component (a1) | Polyolefin polyol (a11) having constituent unit represented by General Formula (1) and/or constituent unit represented by General Formula (2) | NISSO-PB GI-2000 | 161.6 | — | 94.0 | 136.3 | 161.6 | 161.6 | 178.4 |
| | | | NISSO-PB G-2000 | — | — | — | — | — | — | — |
| | | | Hydroxyl group-modified polyolefin (a11-1) (Mn = 4,500) | — | 148.7 | — | — | — | — | — |
| | | Polyester polyol (a12) having constituent unit represented by General Formula (3) | Polyester polyol (a12-1) obtained in Production Example 1 | 60.6 | 49.6 | 54.2 | 78.6 | 60.6 | — | — |
| | | | Polyester polyol (a12-2) obtained in Production Example 2 | — | — | — | — | — | 60.6 | 26.8 |
| | | Polymer polyol (a13) other than (a11) and (a12) | Kuraray polyol P-2020 | — | — | — | — | — | — | — |
| | | | Kuraray polyol P-2010 | — | — | — | — | — | — | — |
| | | | Sannix PP-2000 | — | — | — | — | — | — | — |
| | | | Ymer N120 | — | — | 59.5 | — | — | — | — |
| | | | PTMG2000 | — | — | — | — | — | — | — |
| | Low-molecular-weight polyol component (a2) having no ionic group and having chemical formula weight or number-average molecular weight of less than 500 | | Neopentyl glycol | 13.2 | 21.1 | 28.2 | — | 13.2 | 13.2 | 18.9 |
| | | | 1,3-butanediol | — | — | — | — | — | — | — |
| | Compound (a3) containing ionic group and active hydrogen atom | | 2,2-dimethylol propionate | 14.6 | 16.7 | — | 31.3 | 14.6 | 14.6 | 14.6 |
| | Organic polyisocyanate component (B) | | IPDI | 99.9 | 113.5 | 113.5 | 103.1 | 99.9 | 99.9 | 111.2 |
| | Urethanization catalyst | | Neostan U-600 | 0.07 | 0.07 | 0.07 | 0.07 | 0.07 | 0.07 | 0.07 |
| | Organic solvent for reaction | | Methyl ethyl ketone | 150.0 | 150.0 | 150.0 | 150.0 | 150.0 | 150.0 | 150.0 |
| Water (parts) as chain extender of prepolymer and aqueous medium | | | | 485.4 | 485.4 | 485.4 | 485.4 | 485.4 | 485.4 | 485.4 |
| Neutralizing agent (parts) | | | Triethylamine | 8.3 | 8.3 | 8.3 | 8.3 | 8.3 | 8.3 | 8.3 |
| Organic solvent for dilution (parts) | | | Methyl ethyl ketone | 74.2 | 74.2 | 74.2 | 74.2 | 74.2 | 74.2 | 74.2 |
| Dimethyl silicone (E) (parts) | | | SM8706EX | 23.6 | — | — | — | — | 23.6 | 23.6 |
| | | | POLON MF-32 | — | — | — | — | — | — | — |
| Dispersant (H) (parts) | | | Naroacty CL120 | — | — | — | — | — | — | — |

| Reference of polyurethane resin aqueous dispersion (Q) | | | | Q-8 | Q-9 | Q-10 | Q-11 | Q-12 | Q'-1 | Q'-2 |
|---|---|---|---|---|---|---|---|---|---|---|
| Raw material for prepolymer production (parts) | Mn 500 or more high-molecular-weight polyol component (a1) | Polyolefin polyol (a11) having constituent unit represented by General Formula (1) and/or constituent unit represented by General Formula (2) | NISSO-PB GI-2000 | 39.7 | — | 195.1 | 195.1 | 161.6 | 143.2 | — |
| | | | NISSO-PB G-2000 | — | 170.5 | — | — | — | — | — |
| | | | Hydroxyl group-modified polyolefin (a11-1) (Mn = 4,500) | | | | | | | |

TABLE 1-continued

| | | | | | | | | | |
|---|---|---|---|---|---|---|---|---|---|
| | Polyester polyol (a12) having constituent unit represented by General Formula (3) | Polyester polyol (a12-1) obtained in Production Example 1 | — | — | 8.6 | 8.6 | 60.6 | — | 58.9 |
| | | Polyester polyol (a12-2) obtained in Production Example 2 | 198.4 | 53.9 | — | — | — | — | — |
| | Polymer polyol (a13) other than (a11) and (a12) | Kuraray polyol P-2020 | — | — | 10.9 | 10.9 | — | — | — |
| | | Kuraray polyol P-2010 | — | — | — | — | — | 71.6 | — |
| | | Sannix PP-2000 | — | — | — | — | — | — | 157.1 |
| | | Ymer N120 | — | — | — | — | — | — | — |
| | | PTMG2000 | — | — | 5.1 | 5.1 | — | — | — |
| Low-molecular-weight polyol component (a2) having no ionic group and having chemical formula weight or number-average molecular weight of less than 500 | | Neopentyl glycol | 6.6 | — | 15.8 | 15.8 | 13.2 | 16.3 | 15.2 |
| | | 1,3-butanediol | — | 11.0 | — | — | — | — | — |
| Compound (a3) containing ionic group and active hydrogen atom | | 2,2-dimethylol propionate | 14.6 | 14.6 | 14.6 | 14.6 | 14.6 | 14.6 | 14.6 |
| Organic polyisocyanate component (B) | | IPDI | 90.6 | 99.9 | 99.9 | 99.9 | 99.9 | 104.1 | 104.1 |
| Urethanization catalyst | | Neostan U-600 | 0.07 | 0.07 | 0.07 | 0.07 | 0.07 | 0.07 | 0.07 |
| Organic solvent for reaction | | Methyl ethyl ketone | 150.0 | 150.0 | 150.0 | 150.0 | 150.0 | 150.0 | 150.0 |
| Water (parts) as chain extender of prepolymer and aqueous medium | | | 485.4 | 485.4 | 485.4 | 485.4 | 485.4 | 485.4 | 485.4 |
| Neutralizing agent (parts) | | Triethylamine | 8.3 | 8.3 | 8.3 | 8.3 | 8.3 | 8.3 | 8.3 |
| Organic solvent for dilution (parts) | | Methyl ethyl ketone | 74.2 | 74.2 | 74.2 | 74.2 | 74.2 | 74.2 | 74.2 |
| Dimethyl silicone (E) (parts) | | SM8706EX | — | — | 23.6 | — | 23.6 | 23.6 | 23.6 |
| | | POLON MF-32 | 23.6 | 23.6 | — | — | — | — | — |
| Dispersant (H) (parts) | | Naroacty CL120 | — | — | — | — | 35.0 | — | — |

Table 2 shows the weight ratio (mass ratio) of the constituent units of the polyurethane resin (U) for each polyurethane resin aqueous dispersion.

4.2. Preparation of Ink Jet Ink Composition

After sufficiently stirring the polyurethane resin dispersion described above and the components shown in Table 3

TABLE 2

| Reference of polyurethane resin aqueous dispersion (Q) | Q-1 | Q-2 | Q-3 | Q-4 | Q-5 | Q-6 | Q-7 | Q-8 | Q-9 | Q-10 | Q-11 | Q-12 | Q'-1 | Q'-2 |
|---|---|---|---|---|---|---|---|---|---|---|---|---|---|---|
| Total weight ratio of constituent unit represented by General Formula (1) and/or General Formula (2) in (U) (% by weight) | 45 | 42 | 26 | 38 | 45 | 45 | 50 | 11 | 48 | 54 | 54 | 45 | 40 | 0 |
| Total weight ratio of constituent unit represented by General Formula (3) in (U) (% by weight) | 13 | 11 | 12 | 18 | 13 | 9 | 4 | 28 | 12 | 4 | 4 | 13 | 0 | 13 |
| Use amount of (E) with respect to (U) (% by weight) | 2.5 | 0 | 0 | 0 | 0 | 2.5 | 2.5 | 2.5 | 2.5 | 3 | 0 | 2.5 | 2.5 | 2.5 | to Table 6, vacuum filtration was performed with a microfilter (produced by Millipore) having a pore size of 5.0 μm and each ink jet ink composition of each Example and Comparative Example was prepared. The composition of each ink jet ink composition is shown in the table. For polyurethane resin dispersions and pigments, the net addition amount of solid content is shown. The ion-exchanged water is the remaining amount (the remaining amount is the amount at which the total amount of all the components of the ink is 100.0%). Here, for the pigment, a dispersant, which is a styrene acrylic-based water-soluble resin not listed in the table, was mixed with water at a pigment:dispersant mass ratio of 2:1 and stirred to prepare a pigment dispersion liquid, which was used. Unless otherwise specified, % relating to a component amount describes % by mass.

BYK AQUACER 515: Polyolefin wax (produced by BYK Chemie)

BYK-348: Silicone-based surfactant (produced by BYK Chemie)

Proxel XL2: Preservative (produced by Lonza)

TABLE 3

| Cyan Ink No. | | | Examples | | | | | | |
|---|---|---|---|---|---|---|---|---|---|
| | | | C1 | C2 | C3 | C4 | C5 | C6 | C7 |
| Coloring material | Cyan pigment dispersion | Solvent boiling point | 6.0 | 6.0 | 6.0 | 6.0 | 6.0 | 6.0 | 6.0 |
| Polyurethane aqueous dispersion | Q-1 | | 6.0 | — | — | — | — | — | — |
| | Q-2 | | — | 6.0 | — | — | — | — | — |
| | Q-3 | | — | — | 6.0 | — | — | — | — |
| | Q-4 | | — | — | — | 6.0 | — | — | — |
| | Q-5 | | — | — | — | — | 6.0 | — | — |
| | Q-6 | | — | — | — | — | — | 6.0 | — |
| | Q-7 | | — | — | — | — | — | — | 6.0 |
| | Q-8 | | — | — | — | — | — | — | — |
| | Q-9 | | — | — | — | — | — | — | — |
| | Q-10 | | — | — | — | — | — | — | — |
| | Q-11 | | — | — | — | — | — | — | — |
| | Q-12 | | — | — | — | — | — | — | — |
| | Q'-1 | | — | — | — | — | — | — | — |
| | Q'-2 | | — | — | — | — | — | — | — |
| Organic solvent | 1,2-propanediol | 188° C. | 20.0 | 20.0 | 20.0 | 20.0 | 20.0 | 20.0 | 20.0 |
| | 1,3-propanediol | 214° C. | — | — | — | — | — | — | — |
| | 1,2-butanediol | 194° C. | — | — | — | — | — | — | — |
| | 2,3-butanediol | 182° C. | — | — | — | — | — | — | — |
| | 1,2-hexanediol | 223° C. | 5.0 | 5.0 | 5.0 | 5.0 | 5.0 | 5.0 | 5.0 |
| | 2-methyl-2,4-pentanediol | 197° C. | — | — | — | — | — | — | — |
| | Dipropyleneglycol monobutyl ether | 188° C. | 5.0 | 5.0 | 5.0 | 5.0 | 5.0 | 5.0 | 5.0 |
| | 3-methoxy-3-methyl-1-butanol | 174° C. | — | — | — | — | — | — | — |
| | 3-methoxy-N,N-dimethyl-propionamide | 215° C. | — | — | — | — | — | — | — |
| Wax | BYK AQUACER 515 | | — | — | — | — | — | — | — |
| Surface tension adjuster | BYK348 | | 0.5 | 0.5 | 0.5 | 0.5 | 0.5 | 0.5 | 0.5 |
| pH adjuster | Triisopropanolamine | | 0.1 | 0.1 | 0.1 | 0.1 | 0.1 | 0.1 | 0.1 |
| Anti-bacteria preservative | Proxel XL2 | | 0.1 | 0.1 | 0.1 | 0.1 | 0.1 | 0.1 | 0.1 |
| Water | High purity water | | Remainder | Remainder | Remainder | Remainder | Remainder | Remainder | Remainder |
| Total (% by mass) | | | 100 | 100 | 100 | 100 | 100 | 100 | 100 |

| Cyan Ink No. | | | Examples | | | | | Comparative Examples | |
|---|---|---|---|---|---|---|---|---|---|
| | | | C8 | C9 | C10 | C11 | C12 | C13 | C14 |
| Coloring material | Cyan pigment dispersion | Solvent boiling point | 6.0 | 6.0 | 6.0 | 6.0 | 6.0 | 6.0 | 6.0 |
| Polyurethane aqueous dispersion | Q-1 | | — | — | — | — | — | — | — |
| | Q-2 | | — | — | — | — | — | — | — |
| | Q-3 | | — | — | — | — | — | — | — |
| | Q-4 | | — | — | — | — | — | — | — |
| | Q-5 | | — | — | — | — | — | — | — |
| | Q-6 | | — | — | — | — | — | — | — |
| | Q-7 | | — | — | — | — | — | — | — |
| | Q-8 | | 6.0 | — | — | — | — | — | — |
| | Q-9 | | — | 6.0 | — | — | — | — | — |
| | Q-10 | | — | — | 6.0 | — | — | — | — |
| | Q-11 | | — | — | — | 6.0 | — | — | — |
| | Q-12 | | — | — | — | — | 6.0 | — | — |
| | Q'-1 | | — | — | — | — | — | 6.0 | — |
| | Q'-2 | | — | — | — | — | — | — | 6.0 |

TABLE 3-continued

| | | | | | | | | | |
|---|---|---|---|---|---|---|---|---|---|
| Organic solvent | 1,2-propanediol | 188° C. | 20.0 | 20.0 | 20.0 | 20.0 | 20.0 | 20.0 | 20.0 |
| | 1,3-propanediol | 214° C. | — | — | — | — | — | — | — |
| | 1,2-butanediol | 194° C. | — | — | — | — | — | — | — |
| | 2,3-butanediol | 182° C. | — | — | — | — | — | — | — |
| | 1,2-hexanediol | 223° C. | 5.0 | 5.0 | 5.0 | 5.0 | 5.0 | 5.0 | 5.0 |
| | 2-methyl-2,4-pentanediol | 197° C. | — | — | — | — | — | — | — |
| | Dipropyleneglycol monobutyl ether | 188° C. | 5.0 | 5.0 | 5.0 | 5.0 | 5.0 | 5.0 | 5.0 |
| | 3-methoxy-3-methyl-1-butanol | 174° C. | — | — | — | — | — | — | — |
| | 3-methoxy-N,N-dimethyl-propionamide | 215° C. | — | — | — | — | — | — | — |
| Wax | BYK AQUACER 515 | | — | — | — | — | — | — | — |
| Surface tension adjuster | BYK348 | | 0.5 | 0.5 | 0.5 | 0.5 | 0.5 | 0.5 | 0.5 |
| pH adjuster | Triisopropanolamine | | 0.1 | 0.1 | 0.1 | 0.1 | 0.1 | 0.1 | 0.1 |
| Anti-bacteria preservative | Proxel XL2 | | 0.1 | 0.1 | 0.1 | 0.1 | 0.1 | 0.1 | 0.1 |
| Water | High purity water | | Remainder | Remainder | Remainder | Remainder | Remainder | Remainder | Remainder |
| Total (% by mass) | | | 100 | 100 | 100 | 100 | 100 | 100 | 100 |

TABLE 4

| | | | Examples | | | | | | |
|---|---|---|---|---|---|---|---|---|---|
| Cyan Ink No. | | | C15 | C16 | C17 | C18 | C19 | C20 | C21 |
| Coloring material | Cyan pigment dispersion | Solvent boiling point | 6.0 | 6.0 | 6.0 | 6.0 | 6.0 | 6.0 | 6.0 |
| Polyurethane aqueous dispersion | Q-1 | | — | 3.0 | 12.0 | — | — | — | — |
| | Q-2 | | — | — | — | — | — | — | — |
| | Q-3 | | — | — | — | — | — | — | — |
| | Q-4 | | — | — | — | — | — | — | — |
| | Q-5 | | 6.0 | — | — | 6.0 | 6.0 | 6.0 | 6.0 |
| | Q-6 | | — | — | — | — | — | — | — |
| | Q-7 | | — | — | — | — | — | — | — |
| | Q-8 | | — | — | — | — | — | — | — |
| | Q-9 | | — | — | — | — | — | — | — |
| | Q-10 | | — | — | — | — | — | — | — |
| | Q-11 | | — | — | — | — | — | — | — |
| | Q-12 | | — | — | — | — | — | — | — |
| | Q'-1 | | — | — | — | — | — | — | — |
| | Q'-2 | | — | — | — | — | — | — | — |
| Organic solvent | 1,2-propanediol | 188° C. | 20.0 | 20.0 | 20.0 | 10.0 | 30.0 | 20.0 | — |
| | 1,3-propanediol | 214° C. | — | — | — | — | — | — | — |
| | 1,2-butanediol | 194° C. | — | — | — | — | — | — | — |
| | 2,3-butanediol | 182° C. | — | — | — | — | — | — | 20.0 |
| | 1,2-hexanediol | 223° C. | 5.0 | 5.0 | 5.0 | 5.0 | 5.0 | — | 5.0 |
| | 2-methyl-2,4-pentanediol | 197° C. | — | — | — | — | — | — | — |
| | Dipropyleneglycol monobutyl ether | 188° C. | 5.0 | 5.0 | 5.0 | 5.0 | 5.0 | 5.0 | 5.0 |
| | 3-methoxy-3-methyl-1-butanol | 174° C. | — | — | — | — | — | — | — |
| | 3-methoxy-N, N-dimethyl-propionamide | 215° C. | — | — | — | — | — | — | — |
| Wax | BYK AQUACER 515 | | 1.0 | — | — | — | — | — | — |
| Surface tension adjuster | BYK348 | | 0.5 | 0.5 | 0.5 | 0.5 | 0.5 | 1.0 | 0.5 |
| pH adjuster | Triisopropanolamine | | 0.1 | 0.1 | 0.1 | 0.1 | 0.1 | 0.1 | 0.1 |
| Anti-bacteria preservative | Proxel XL2 | | 0.1 | 0.1 | 0.1 | 0.1 | 0.1 | 0.1 | 0.1 |
| Water | High purity water | | Remainder | Remainder | Remainder | Remainder | Remainder | Remainder | Remainder |
| Total (% by mass) | | | 100 | 100 | 100 | 100 | 100 | 100 | 100 |

TABLE 4-continued

| Cyan Ink No. | | | Examples | | | | | |
|---|---|---|---|---|---|---|---|---|
| | | | C22 | C23 | C24 | C25 | C26 | C27 |
| Coloring material | Cyan pigment dispersion | Solvent boiling point | 6.0 | 6.0 | 6.0 | 6.0 | 6.0 | 6.0 |
| Polyurethane aqueous dispersion | Q-1 | | — | — | — | — | — | — |
| | Q-2 | | — | — | — | — | — | — |
| | Q-3 | | — | — | — | — | — | — |
| | Q-4 | | — | — | — | — | — | — |
| | Q-5 | | 6.0 | 6.0 | 6.0 | 6.0 | 6.0 | 6.0 |
| | Q-6 | | — | — | — | — | — | — |
| | Q-7 | | — | — | — | — | — | — |
| | Q-8 | | — | — | — | — | — | — |
| | Q-9 | | — | — | — | — | — | — |
| | Q-10 | | — | — | — | — | — | — |
| | Q-11 | | — | — | — | — | — | — |
| | Q-12 | | — | — | — | — | — | — |
| | Q'-1 | | — | — | — | — | — | — |
| | Q'-2 | | — | — | — | — | — | — |
| Organic solvent | 1,2-propanediol | 188° C. | — | — | — | — | 20.0 | — |
| | 1,3-propanediol | 214° C. | 20.0 | — | — | — | — | — |
| | 1,2-butanediol | 194° C. | — | 20.0 | — | — | — | — |
| | 2,3-butanediol | 182° C. | — | — | — | — | — | — |
| | 1,2-hexanediol | 223° C. | 5.0 | 5.0 | 5.0 | 5.0 | 5.0 | 5.0 |
| | 2-methyl-2,4-pentanediol | 197° C. | — | — | 20.0 | — | — | — |
| | Dipropyleneglycol monobutyl ether | 188° C. | 5.0 | 5.0 | 5.0 | 5.0 | — | — |
| | 3-methoxy-3-methyl-1-butanol | 174° C. | — | — | — | 20.0 | — | 20.0 |
| | 3-methoxy-N,N-dimethyl-propionamide | 215° C. | — | — | — | — | 5.0 | 5.0 |
| Wax | BYK AQUACER 515 | | — | — | — | — | — | — |
| Surface tension adjuster | BYK348 | | 0.5 | 0.5 | 0.5 | 0.5 | 0.5 | 0.5 |
| pH adjuster | Triisopropanolamine | | 0.1 | 0.1 | 0.1 | 0.1 | 0.1 | 0.1 |
| Anti-bacteria preservative | Proxel XL2 | | 0.1 | 0.1 | 0.1 | 0.1 | 0.1 | 0.1 |
| Water | High purity water | | Remainder | Remainder | Remainder | Remainder | Remainder | Remainder |
| Total (% by mass) | | | 100 | 100 | 100 | 100 | 100 | 100 |

TABLE 5

| White Ink No. | | | Examples | | | | | | |
|---|---|---|---|---|---|---|---|---|---|
| | | | W1 | W2 | W3 | W4 | W5 | W6 | W7 |
| Coloring material | White pigment dispersion | Solvent boiling point | 15.0 | 15.0 | 15.0 | 15.0 | 15.0 | 15.0 | 15.0 |
| Polyurethane aqueous dispersion | Q-1 | | 10.0 | — | — | — | — | — | — |
| | Q-2 | | — | 10.0 | — | — | — | — | — |
| | Q-3 | | — | — | 10.0 | — | — | — | — |
| | Q-4 | | — | — | — | 10.0 | — | — | — |
| | Q-5 | | — | — | — | — | 10.0 | — | — |
| | Q-6 | | — | — | — | — | — | 10.0 | — |
| | Q-7 | | — | — | — | — | — | — | 10.0 |
| | Q-8 | | — | — | — | — | — | — | — |
| | Q-9 | | — | — | — | — | — | — | — |
| | Q-10 | | — | — | — | — | — | — | — |
| | Q-11 | | — | — | — | — | — | — | — |
| | Q-12 | | — | — | — | — | — | — | — |
| | Q'-1 | | — | — | — | — | — | — | — |
| | Q'-2 | | — | — | — | — | — | — | — |
| Organic solvent | 1,2-propanediol | 188° C. | 20.0 | 20.0 | 20.0 | 20.0 | 20.0 | 20.0 | 20.0 |
| | 1,3-propanediol | 214° C. | — | — | — | — | — | — | — |
| | 1,2-butanediol | 194° C. | — | — | — | — | — | — | — |
| | 2,3-butanediol | 182° C. | — | — | — | — | — | — | — |
| | 1,2-hexanediol | 223° C. | 5.0 | 5.0 | 5.0 | 5.0 | 5.0 | 5.0 | 5.0 |
| | 2-methyl-2,4-pentanediol | 197° C. | — | — | — | — | — | — | — |
| | Dipropyleneglycol monobutyl ether | 188° C. | 5.0 | 5.0 | 5.0 | 5.0 | 5.0 | 5.0 | 5.0 |

TABLE 5-continued

| | | | | | | | | | |
|---|---|---|---|---|---|---|---|---|---|
| | 3-methoxy-3-methyl-1-butanol | 174° C. | — | — | — | — | — | — | — |
| | 3-methoxy-N,N-dimethyl-propionamide | 215° C. | — | — | — | — | — | — | — |
| Wax | BYK AQUACER 515 | | — | — | — | — | — | — | — |
| Surface tension adjuster | BYK348 | | 0.5 | 0.5 | 0.5 | 0.5 | 0.5 | 0.5 | 0.5 |
| pH adjuster | Triisopropanolamine | | 0.1 | 0.1 | 0.1 | 0.1 | 0.1 | 0.1 | 0.1 |
| Anti-bacteria preservative | Proxel XL2 | | 0.1 | 0.1 | 0.1 | 0.1 | 0.1 | 0.1 | 0.1 |
| Water | High purity water | | Remainder | Remainder | Remainder | Remainder | Remainder | Remainder | Remainder |
| Total (% by mass) | | | 100 | 100 | 100 | 100 | 100 | 100 | 100 |

| | | | Examples | | | | | Comparative Examples | |
|---|---|---|---|---|---|---|---|---|---|
| White Ink No. | | | W8 | W9 | W10 | W11 | W12 | W13 | W14 |
| Coloring material | White pigment dispersion | Solvent boiling point | 15.0 | 15.0 | 15.0 | 15.0 | 15.0 | 15.0 | 15.0 |
| Polyurethane aqueous dispersion | Q-1 | | — | — | — | — | — | — | — |
| | Q-2 | | — | — | — | — | — | — | — |
| | Q-3 | | — | — | — | — | — | — | — |
| | Q-4 | | — | — | — | — | — | — | — |
| | Q-5 | | — | — | — | — | — | — | — |
| | Q-6 | | — | — | — | — | — | — | — |
| | Q-7 | | — | — | — | — | — | — | — |
| | Q-8 | | 10.0 | — | — | — | — | — | — |
| | Q-9 | | — | 10.0 | — | — | — | — | — |
| | Q-10 | | — | — | 10.0 | — | — | — | — |
| | Q-11 | | — | — | — | 10.0 | — | — | — |
| | Q-12 | | — | — | — | — | 10.0 | — | — |
| | Q'-1 | | — | — | — | — | — | 10.0 | — |
| | Q'-2 | | — | — | — | — | — | — | 10.0 |
| Organic solvent | 1,2-propanediol | 188° C. | 20.0 | 20.0 | 20.0 | 20.0 | 20.0 | 20.0 | 20.0 |
| | 1,3-propanediol | 214° C. | — | — | — | — | — | — | — |
| | 1,2-butanediol | 194° C. | — | — | — | — | — | — | — |
| | 2,3-butanediol | 182° C. | — | — | — | — | — | — | — |
| | 1,2-hexanediol | 223° C. | 5.0 | 5.0 | 5.0 | 5.0 | 5.0 | 5.0 | 5.0 |
| | 2-methyl-2,4-pentanediol | 197° C. | — | — | — | — | — | — | — |
| | Dipropyleneglycol monobutyl ether | 188° C. | 5.0 | 5.0 | 5.0 | 5.0 | 5.0 | 5.0 | 5.0 |
| | 3-methoxy-3-methyl-1-butanol | 174° C. | — | — | — | — | — | — | — |
| | 3-methoxy-N,N-dimethyl-propionamide | 215° C. | — | — | — | — | — | — | — |
| Wax | BYK AQUACER 515 | | — | — | — | — | — | — | — |
| Surface tension adjuster | BYK348 | | 0.5 | 0.5 | 0.5 | 0.5 | 0.5 | 0.5 | 0.5 |
| pH adjuster | Triisopropanolamine | | 0.1 | 0.1 | 0.1 | 0.1 | 0.1 | 0.1 | 0.1 |
| Anti-bacteria preservative | Proxel XL2 | | 0.1 | 0.1 | 0.1 | 0.1 | 0.1 | 0.1 | 0.1 |
| Water | High purity water | | Remainder | Remainder | Remainder | Remainder | Remainder | Remainder | Remainder |
| Total (% by mass) | | | 100 | 100 | 100 | 100 | 100 | 100 | 100 |

TABLE 6

| | | | Examples | | | | | | |
|---|---|---|---|---|---|---|---|---|---|
| White Ink No. | | | W15 | W16 | W17 | W18 | W19 | W20 | W21 |
| Coloring material | White pigment dispersion | Solvent boiling point | 15.0 | 15.0 | 15.0 | 15.0 | 15.0 | 15.0 | 15.0 |
| Polyurethane aqueous dispersion | Q-1 | | — | 5.0 | 20.0 | — | — | — | — |
| | Q-2 | | — | — | — | — | — | — | — |
| | Q-3 | | — | — | — | — | — | — | — |
| | Q-4 | | — | — | — | — | — | — | — |
| | Q-5 | | 10.0 | — | — | 10.0 | 10.0 | 10.0 | 10.0 |
| | Q-6 | | — | — | — | — | — | — | — |
| | Q-7 | | — | — | — | — | — | — | — |
| | Q-8 | | — | — | — | — | — | — | — |
| | Q-9 | | — | — | — | — | — | — | — |

TABLE 6-continued

|  |  |  | | | | | | | |
|---|---|---|---|---|---|---|---|---|---|
|  | Q-10 |  | — | — | — | — | — | — | — |
|  | Q-11 |  | — | — | — | — | — | — | — |
|  | Q-12 |  | — | — | — | — | — | — | — |
|  | Q'-1 |  | — | — | — | — | — | — | — |
|  | Q'-2 |  | — | — | — | — | — | — | — |
| Organic solvent | 1,2-propanediol | 188° C. | 20.0 | 20.0 | 20.0 | 10.0 | 30.0 | 20.0 | — |
|  | 1,3-propanediol | 214° C. | — | — | — | — | — | — | — |
|  | 1,2-butanediol | 194° C. | — | — | — | — | — | — | — |
|  | 2,3-butanediol | 182° C. | — | — | — | — | — | — | 20.0 |
|  | 1,2-hexanediol | 223° C. | 5.0 | 5.0 | 5.0 | 5.0 | 5.0 | — | 5.0 |
|  | 2-methyl-2,4-pentanediol | 197° C. | — | — | — | — | — | — | — |
|  | Dipropyleneglycol monobutyl ether | 188° C. | 5.0 | 5.0 | 5.0 | 5.0 | 5.0 | 5.0 | 5.0 |
|  | 3-methoxy-3-methyl-1-butanol | 174° C. | — | — | — | — | — | — | — |
|  | 3-methoxy-N,N-dimethyl-propionamide | 215° C. | — | — | — | — | — | — | — |
| Wax | BYK AQUACER 515 |  | 1.0 | — | — | — | — | — | — |
| Surface tension adjuster | BYK348 |  | 0.5 | 0.5 | 0.5 | 0.5 | 0.5 | 1.0 | 0.5 |
| pH adjuster | Triisopropanolamine |  | 0.1 | 0.1 | 0.1 | 0.1 | 0.1 | 0.1 | 0.1 |
| Anti-bacteria preservative | Proxel XL2 |  | 0.1 | 0.1 | 0.1 | 0.1 | 0.1 | 0.1 | 0.1 |
| Water | High purity water |  | Remainder | Remainder | Remainder | Remainder | Remainder | Remainder | Remainder |
| Total (% by mass) |  |  | 100 | 100 | 100 | 100 | 100 | 100 | 100 |

|  |  |  | Examples | | | | | |
|---|---|---|---|---|---|---|---|---|
| White Ink No. |  |  | W22 | W23 | W24 | W25 | W26 | W27 |
| Coloring material | White pigment dispersion | Solvent boiling point | 15.0 | 15.0 | 15.0 | 15.0 | 15.0 | 15.0 |
| Polyurethane aqueous dispersion | Q-1 |  | — | — | — | — | — | — |
|  | Q-2 |  | — | — | — | — | — | — |
|  | Q-3 |  | — | — | — | — | — | — |
|  | Q-4 |  | — | — | — | — | — | — |
|  | Q-5 |  | 10.0 | 10.0 | 10.0 | 10.0 | 10.0 | 10.0 |
|  | Q-6 |  | — | — | — | — | — | — |
|  | Q-7 |  | — | — | — | — | — | — |
|  | Q-8 |  | — | — | — | — | — | — |
|  | Q-9 |  | — | — | — | — | — | — |
|  | Q-10 |  | — | — | — | — | — | — |
|  | Q-11 |  | — | — | — | — | — | — |
|  | Q-12 |  | — | — | — | — | — | — |
|  | Q'-1 |  | — | — | — | — | — | — |
|  | Q'-2 |  | — | — | — | — | — | — |
| Organic solvent | 1,2-propanediol | 188° C. | — | — | — | — | 20.0 | — |
|  | 1,3-propanediol | 214° C. | 20.0 | — | — | — | — | — |
|  | 1,2-butanediol | 194° C. | — | 20.0 | — | — | — | — |
|  | 2,3-butanediol | 182° C. | — | — | — | — | — | — |
|  | 1,2-hexanediol | 223° C. | 5.0 | 5.0 | 5.0 | 5.0 | 5.0 | 5.0 |
|  | 2-methyl-2,4-pentanediol | 197° C. | — | — | 20.0 | — | — | — |
|  | Dipropyleneglycol monobutyl ether | 188° C. | 5.0 | 5.0 | 5.0 | 5.0 | — | — |
|  | 3-methoxy-3-methyl-1-butanol | 174° C. | — | — | — | 20.0 | — | 20.0 |
|  | 3-methoxy-N,N-dimethyl-propionamide | 215° C. | — | — | — | — | 5.0 | 5.0 |
| Wax | BYK AQUACER 515 |  | — | — | — | — | — | — |
| Surface tension adjuster | BYK348 |  | 0.5 | 0.5 | 0.5 | 0.5 | 0.5 | 0.5 |
| pH adjuster | Triisopropanolamine |  | 0.1 | 0.1 | 0.1 | 0.1 | 0.1 | 0.1 |
| Anti-bacteria preservative | Proxel XL2 |  | 0.1 | 0.1 | 0.1 | 0.1 | 0.1 | 0.1 |
| Water | High purity water |  | Remainder | Remainder | Remainder | Remainder | Remainder | Remainder |
| Total (% by mass) |  |  | 100 | 100 | 100 | 100 | 100 | 100 |

4.3. Recording Test

A line-type ink jet recording apparatus which ejects ink from an ink jet head by the action of the energy of a piezo element was prepared. L-4533A (produced by Seiko Epson Corporation) was modified and prepared. The configuration is as shown in FIGURE. The ink jet ink composition obtained as described above was filled in a nozzle row of an ink jet head and used for recording. During recording, a platen heater was operated to set the surface temperature (maximum temperature) of the recording medium to 45° C.

at the location facing the ink jet head when attaching the ink. After the ink was attached, the recording medium was secondarily heated at 80° C. by a downstream secondary heating device. In the nozzle row, the nozzle density was 600 npi. The image had a recording resolution of 600×600 dpi. The attachment amount of ink per unit of area in the image was taken as the value in the table.

A recording test using cyan ink, a recording test using white ink, and a recording test using cyan ink and white ink were performed, respectively. The evaluation tests below were performed, and the recording tests using cyan ink are shown in Table 7 and Table 8, the recording tests using white ink are shown in Table 9 and Table 10, and the recording tests using cyan ink and white ink are shown in Table 11 and Table 12.

Here, in the recording test using cyan ink and white ink, the white ink was attached first and the cyan ink layer was overlapped and recorded on the white ink layer.

The recording media below were used.
OPP film: Surface-treated polypropylene film (OPP) ["Pylen β-2161" produced by Toyobo Co., Ltd. (thickness 30 μm)]
PET film: Surface-treated polyester film (PET) ["Espet E-5102" produced by Toyobo Co., Ltd. (thickness 12 μm)]
Nylon film: Surface-treated nylon film ["Harden N-1130" produced by Toyobo Co., Ltd. (thickness 15 μm)]

4.4. Evaluation Test

Adhesion

In accordance with JIS K5600-5-6, notches were made with a cutter knife in a recording pattern portion of the recorded matter at a width of 1 mm to be able to make 100 square cells (10×10), a peeling test was performed with adhesive tape, and the number of square cells remaining on the base material film was counted. The larger the number of remaining square cells, the better the adhesion of the ink coating film. As the adhesive tape, a cloth adhesive tape (123LW-50 produced by Nichiban Co., Ltd.) was used.

A: No peeling is seen in any of 100 square cells
B: In 100 square cells, 1 or more and 10 or fewer are peeled off
C: In 100 square cells, 11 or more and 30 or fewer are peeled off
D: In 100 square cells, 31 or more are peeled off DRY Abrasion Resistance Using a color fastness rubbing tester (Tester Sangyo Co., Ltd. AB-301), a load of 200 g was applied to an image (recording pattern portion) with a dry white cotton cloth for applying friction, friction was applied with 100 reciprocations at a speed of 30 reciprocations per minute, and the "abrasion resistance" was evaluated by visual observation based on the evaluation criteria below.

A: The image does not change even after rubbing 100 times or more
B: Some scratches remain after rubbing 100 times, but the image is not affected
C: The image changes after 51 times or more and 99 times or less
D: The image changes after 50 times or less WET Abrasion Resistance Similarly, using a color fastness rubbing tester (Tester Sangyo Co., Ltd. AB-301), a load of 200 g was applied to an image (recording pattern portion) with a white cotton cloth for applying friction which was moistened with water and in a state of being wetted to approximately 100% by mass with respect to the cloth, friction was applied with 10 reciprocations at a speed of 30 reciprocations per minute, and the "abrasion resistance" was evaluated by visual observation based on the same evaluation criteria as the dry abrasion resistance.

4.5. Evaluation Results

TABLE 7

| | | | | | | | | Examples | | | | | | | | Comparative Examples | |
|---|---|---|---|---|---|---|---|---|---|---|---|---|---|---|---|---|---|
| Recording example No. | | | K101 | K102 | K103 | K104 | K105 | K106 | K107 | K108 | K109 | K110 | K111 | K112 | K113 | K114 |
| Ink No. | | | C1 | C2 | C3 | C4 | C5 | C6 | C7 | C8 | C9 | C10 | C11 | C12 | C13 | C14 |
| Ink attachment amount mg/inch$^2$ | | | 3 | 3 | 3 | 3 | 3 | 3 | 3 | 3 | 3 | 3 | 3 | 3 | 3 | 3 |
| Low-polar base material | OPP film | Adhesion | A | A | A | A | B | A | A | B | B | A | A | B | A | D |
| | | DRY abrasion resistance | A | A | B | B | B | A | A | B | B | A | A | B | A | D |
| | | WET abrasion resistance | A | A | B | A | B | A | A | B | B | A | B | B | A | D |
| Polar base material | PET film | Adhesion | A | A | A | A | B | B | B | A | A | B | B | B | D | A |
| | | DRY abrasion resistance | A | B | B | A | B | B | B | A | A | B | B | B | D | A |
| | | WET abrasion resistance | A | B | B | A | B | B | B | A | A | B | B | B | D | A |
| | Nylon film | Adhesion | A | A | A | B | B | A | B | A | A | B | B | B | D | A |
| | | DRY abrasion resistance | A | B | B | B | B | A | B | A | A | B | B | B | D | A |
| | | WET abrasion resistance | A | B | B | B | B | A | B | A | A | B | B | B | D | A |

TABLE 8

| | | | Examples | | | | | | | | | | | | | | |
|---|---|---|---|---|---|---|---|---|---|---|---|---|---|---|---|---|---|
| Recording example No. | | | K115 | K116 | K117 | K118 | K119 | K120 | K121 | K122 | K123 | K124 | K125 | K126 | K127 | K128 | K129 |
| Ink No. | | | C15 | C16 | C17 | C18 | C19 | C20 | C21 | C22 | C23 | C24 | C25 | C26 | C27 | C1 | C1 |
| Ink attachment amount mg/inch² | | | 3 | 3 | 3 | 3 | 3 | 3 | 3 | 3 | 3 | 3 | 3 | 3 | 3 | 0.1 | 6.0 |
| Low-polar base material | OPP film | Adhesion | B | A | A | B | B | B | B | B | B | B | B | A | A | A | A |
| | | DRY abrasion resistance | A | A | A | A | C | A | A | C | C | C | A | B | A | A | A |
| | | WET abrasion resistance | B | B | A | B | B | B | B | B | B | B | B | A | A | A | A |
| Polar base material | PET film | Adhesion | B | A | A | B | B | B | B | B | B | B | B | A | A | A | A |
| | | DRY abrasion resistance | A | A | A | A | C | A | A | C | C | C | A | B | A | A | A |
| | | WET abrasion resistance | B | B | A | B | B | B | B | B | B | B | B | A | A | A | A |
| | Nylon film | Adhesion | B | A | A | B | B | B | B | B | B | B | B | A | A | A | A |
| | | DRY abrasion resistance | A | A | A | A | C | A | A | C | C | C | A | B | A | A | A |
| | | WET abrasion resistance | B | B | A | B | B | B | B | B | B | B | B | A | A | A | A |

TABLE 9

| | | | Examples | | | | | | | | | | | | Comparative Examples | |
|---|---|---|---|---|---|---|---|---|---|---|---|---|---|---|---|---|
| Recording example No. | | | K201 | K202 | K203 | K204 | K205 | K206 | K207 | K208 | K209 | K210 | K211 | K212 | K213 | K214 |
| Ink No. | | | W1 | W2 | W3 | W4 | W5 | W6 | W7 | W8 | W9 | W10 | W11 | W12 | W13 | W14 |
| Ink attachment amount mg/inch² | | | 4.5 | 4.5 | 4.5 | 4.5 | 4.5 | 4.5 | 4.5 | 4.5 | 4.5 | 4.5 | 4.5 | 4.5 | 4.5 | 4.5 |
| Low-polar base material | OPP film | Adhesion | A | A | A | A | B | A | A | B | B | A | A | B | A | D |
| | | DRY abrasion resistance | A | A | B | B | B | A | A | B | B | A | A | B | A | D |
| | | WET abrasion resistance | A | A | B | A | B | A | A | B | B | A | B | B | A | D |
| Polar base material | PET film | Adhesion | A | A | A | A | B | B | B | A | A | B | B | B | D | A |
| | | DRY abrasion resistance | A | B | B | A | B | B | B | A | A | B | B | B | D | A |
| | | WET abrasion resistance | A | B | B | A | B | B | B | A | A | B | B | B | D | A |
| | Nylon film | Adhesion | A | A | A | B | B | A | B | A | A | B | B | B | D | A |
| | | DRY abrasion resistance | A | B | B | B | B | A | B | A | A | B | B | B | D | A |
| | | WET abrasion resistance | A | B | B | B | B | A | B | A | A | B | B | B | D | A |

TABLE 10

| | | | Examples | | | | | | | | | | | | | | |
|---|---|---|---|---|---|---|---|---|---|---|---|---|---|---|---|---|---|
| Recording example No. | | | K215 | K216 | K217 | K218 | K219 | K220 | K221 | K222 | K223 | K224 | K225 | K226 | K227 | K228 | K229 |
| Ink No. | | | W15 | W16 | W17 | W18 | W19 | W20 | W21 | W22 | W23 | W24 | W25 | W26 | W27 | W1 | W1 |
| Ink attachment amount mg/inch² | | | 4.5 | 4.5 | 4.5 | 4.5 | 4.5 | 4.5 | 4.5 | 4.5 | 4.5 | 4.5 | 4.5 | 4.5 | 4.5 | 0.1 | 9.0 |
| Low-polar base material | OPP film | Adhesion | B | A | A | B | B | B | B | B | B | B | B | A | A | A | A |
| | | DRY abrasion resistance | A | A | A | A | C | A | A | C | C | C | A | B | A | A | A |

TABLE 10-continued

| | | | Examples | | | | | | | | | | | | | |
|---|---|---|---|---|---|---|---|---|---|---|---|---|---|---|---|---|
| Recording example No.<br>Ink No. | | | K215<br>W15 | K216<br>W16 | K217<br>W17 | K218<br>W18 | K219<br>W19 | K220<br>W20 | K221<br>W21 | K222<br>W22 | K223<br>W23 | K224<br>W24 | K225<br>W25 | K226<br>W26 | K227<br>W27 | K228<br>W1 | K229<br>W1 |
| | | WET abrasion resistance | B | B | A | B | B | B | B | B | B | B | B | A | A | A | A |
| Polar base material | PET film | Adhesion | B | A | A | B | B | B | B | B | B | B | B | A | A | A | A |
| | | DRY abrasion resistance | A | A | A | A | C | A | A | C | C | C | A | B | A | A | A |
| | | WET abrasion resistance | B | A | A | B | B | B | B | B | B | B | B | A | A | A | A |
| | Nylon film | Adhesion | B | A | A | B | B | B | B | B | B | B | B | A | A | A | A |
| | | DRY abrasion resistance | A | A | A | A | C | A | A | C | C | C | A | B | A | A | A |
| | | WET abrasion resistance | B | A | A | B | B | B | B | B | B | B | B | A | A | A | A |

TABLE 11

| | | | Examples | | | | | | | | | | | | Comparative Examples | |
|---|---|---|---|---|---|---|---|---|---|---|---|---|---|---|---|---|---|
| Recording example No. | | | K301 | K302 | K303 | K304 | K305 | K306 | K307 | K308 | K309 | K310 | K311 | K312 | K313 | K314 |
| White ink | | | W1 | W2 | W3 | W4 | W5 | W6 | W7 | W8 | W9 | W10 | W11 | W12 | W13 | W14 |
| White ink attachment amount mg/inch$^2$ | | | 4.5 | 4.5 | 4.5 | 4.5 | 4.5 | 4.5 | 4.5 | 4.5 | 4.5 | 4.5 | 4.5 | 4.5 | 4.5 | 4.5 |
| Cyan ink | | | C1 | C2 | C3 | C4 | C5 | C6 | C7 | C8 | C9 | C10 | C11 | C12 | C13 | C14 |
| Cyan ink attachment amount mg/inch$^2$ | | | 3.0 | 3.0 | 3.0 | 3.0 | 3.0 | 3.0 | 3.0 | 3.0 | 3.0 | 3.0 | 3.0 | 3.0 | 3.0 | 3.0 |
| Low-polar base material | OPP film | Adhesion | A | A | A | A | B | A | A | B | B | A | A | B | A | D |
| | | DRY abrasion resistance | A | A | B | B | B | A | A | B | B | A | A | B | A | D |
| | | WET abrasion resistance | A | A | B | A | B | A | A | B | B | A | B | B | A | D |
| Polar base material | PET film | Adhesion | A | A | A | A | B | B | B | A | A | B | B | B | D | A |
| | | DRY abrasion resistance | A | B | B | A | B | B | B | A | A | B | B | B | D | A |
| | | WET abrasion resistance | A | B | B | A | B | B | B | A | A | B | B | B | D | A |
| | Nylon film | Adhesion | A | A | A | B | B | A | B | A | A | B | B | B | D | A |
| | | DRY abrasion resistance | A | B | B | B | B | A | B | A | A | B | B | B | D | A |
| | | WET abrasion resistance | A | B | B | B | B | A | B | A | A | B | B | B | D | A |

TABLE 12

| | | | Examples | | | | | | | | | |
|---|---|---|---|---|---|---|---|---|---|---|---|---|
| Recording example No. | | | K315 | K316 | K317 | K318 | K319 | K320 | K321 | K322 | K323 | K324 |
| White ink | | | W15 | W16 | W17 | W18 | W19 | W20 | W21 | W22 | W23 | W24 |
| White ink attachment amount mg/inch$^2$ | | | 4.5 | 4.5 | 4.5 | 4.5 | 4.5 | 4.5 | 4.5 | 4.5 | 4.5 | 4.5 |
| Cyan ink | | | C15 | C16 | C17 | C18 | C19 | C20 | C21 | C22 | C23 | C24 |
| Cyan ink attachment amount mg/inch$^2$ | | | 3.0 | 3.0 | 3.0 | 3.0 | 3.0 | 3.0 | 3.0 | 3.0 | 3.0 | 3.0 |
| Low-polar base material | OPP film | Adhesion | B | A | A | B | B | B | B | B | B | B |
| | | DRY abrasion resistance | A | A | A | A | C | A | A | C | C | C |

TABLE 12-continued

| | | | | | | | | | | | | |
|---|---|---|---|---|---|---|---|---|---|---|---|---|
| | | WET abrasion resistance | B | B | A | B | B | B | B | B | B | B |
| Polar base material | PET film | Adhesion | B | A | A | B | B | B | B | B | B | B |
| | | DRY abrasion resistance | A | A | A | A | C | A | A | C | C | C |
| | | WET abrasion resistance | B | B | A | B | B | B | B | B | B | B |
| | Nylon film | Adhesion | B | A | A | B | B | B | B | B | B | B |
| | | DRY abrasion resistance | A | A | A | A | C | A | A | C | C | C |
| | | WET abrasion resistance | B | B | A | B | B | B | B | B | B | B |

| | | | Examples | | | | | | | | |
|---|---|---|---|---|---|---|---|---|---|---|---|
| Recording example No. | | | K325 | K326 | K327 | K328 | K329 | K330 | K331 | K332 | K333 |
| White ink | | | W25 | W26 | W27 | W1 | W1 | W13 | W14 | W1 | W1 |
| White ink attachment amount mg/inch$^2$ | | | 4.5 | 4.5 | 4.5 | 0.1 | 9.0 | 4.5 | 4.5 | 4.5 | 4.5 |
| Cyan ink | | | C25 | C26 | C27 | C1 | C1 | C1 | C1 | C13 | C14 |
| Cyan ink attachment amount mg/inch$^2$ | | | 3.0 | 3.0 | 3.0 | 0.1 | 6.0 | 3.0 | 3.0 | 3.0 | 3.0 |
| Low-polar base material | OPP film | Adhesion | B | A | A | A | A | A | C | A | B |
| | | DRY abrasion resistance | A | B | A | A | A | A | B | A | C |
| | | WET abrasion resistance | B | A | A | A | A | A | C | A | B |
| Polar base material | PET film | Adhesion | B | A | A | A | A | C | A | B | A |
| | | DRY abrasion resistance | A | B | A | A | A | B | A | C | A |
| | | WET abrasion resistance | B | A | A | A | A | C | A | B | A |
| | Nylon film | Adhesion | B | A | A | A | A | C | A | B | A |
| | | DRY abrasion resistance | A | B | A | A | A | B | A | C | A |
| | | WET abrasion resistance | B | A | A | A | A | C | A | B | A |

The resin dispersion contained in the ink was a polyurethane resin dispersion formed of a polyurethane resin (U) obtained by reacting the active hydrogen atom-containing component (A) containing the high-molecular-weight polyol component (a1) having a number-average molecular weight of 500 or more with the organic polyisocyanate component (B), in which the high-molecular-weight polyol component (a1) included the polyolefin polyol (a11) having a constituent unit represented by General Formula (1) and/or a constituent unit represented by General Formula (2), and the polyester polyol (a12) having a constituent unit represented by General Formula (3), and, in each of the examples, excellent adhesion was obtained with respect to all base materials of both a polar base material and a low-polar base material.

On the other hand, in all the Comparative Examples which were not as above, the adhesion was inferior with respect to base materials of both the polar base material and the low-polar base material. The details are described below.

From a comparison of K106 and K108 in the Examples, for the polyurethane resin of the resin dispersion included in the ink, the larger the mass ratio of the constituent units represented by General Formula (1) or General Formula (2), the better the adhesion to a polar base material and abrasion resistance. On the other hand, from a comparison of K106 and K107, the larger the mass ratio of the constituent unit represented by General Formula (3), the better the adhesion to a low-polar base material and abrasion resistance.

From a comparison of K101, K105, and K115, when the ink included a silicone emulsion or polyolefin wax, the adhesion and abrasion resistance were superior. The C1 ink used in K101 contains a silicone emulsion as the ink is derived from a dispersion liquid of an aqueous polyurethane dispersion. For the C5 ink used in K105, the ink does not include a silicone emulsion or a polyolefin wax. For the C15 ink used in K115, the ink includes a polyolefin wax.

From a comparison of K101 and K116, the higher the content of the polyurethane resin of the resin dispersion included in the ink, the better the wet abrasion resistance.

From a comparison of K105 and K121 to 123, the lower the boiling point of the organic solvent included in the ink, the better the adhesion and abrasion resistance.

From a comparison of K105, K125, and 126, when the organic solvent included in the ink included a nitrogen-containing solvent or glycol ethers having 8 or fewer carbon atoms, the adhesion and abrasion resistance were superior.

From K201 to 229, the same effect as a cyan ink was obtained even when the ink was a white ink.

From a comparison of K301 and K330 to 333, when a white ink and a non-white ink were used, excellent adhesion and abrasion resistance were obtained when at least one of the inks was the ink of the present embodiment.

From Comparative Example K113, when the polyurethane resin of the resin dispersion did not include the constituent unit represented by General Formula (3), the adhesion and abrasion resistance were inferior with respect to a low-polar base material.

From Comparative Example K114, when the polyurethane resin of the resin dispersion did not include the constituent unit represented by General Formula (1) or (2), the adhesion and abrasion resistance were inferior with respect to a polar base material.

The present disclosure is not limited to the embodiments described above and various modifications are possible. For example, the present disclosure includes configurations substantially the same as the configuration described in the embodiments (for example, configurations having the same function, method and result or configurations having the same purpose and effect). In addition, the present disclosure also includes configurations in which non-essential portions of a configuration described in the embodiments are substituted. In addition, the present disclosure includes configurations which exhibit the same effects as the configuration described in the embodiment or configurations which are able to achieve the same object. In addition, the present disclosure includes configurations in which a known technique is added to a configuration described in the embodiments.

What is claimed is:

1. An ink jet ink composition which is an aqueous ink comprising:
   a resin dispersion, wherein
   the resin dispersion is a polyurethane resin dispersion formed of a polyurethane resin (U) obtained by reacting an active hydrogen atom-containing component (A) containing a high-molecular-weight polyol component (a1) having a number-average molecular weight of 500 or more and an organic polyisocyanate component (B), and
   the high-molecular-weight polyol component (a1) includes a polyolefin polyol (a11) having a constituent unit represented by General Formula (1) and/or a constituent unit represented by General Formula (2), and a polyester polyol (a12) having a constituent unit represented by General Formula (3):

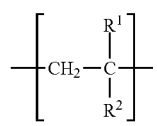 (1)

where, in Formula (1), $R^1$ represents a hydrogen atom, a methyl group, an ethyl group, a vinyl group, an isopropyl group, or an isopropenyl group and $R^2$ represents a hydrogen atom or a methyl group;

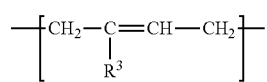 (2)

where, in Formula (2), $R^3$ represents a hydrogen atom or a methyl group;

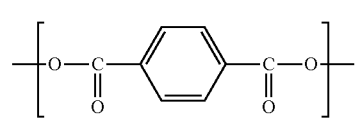 (3)

a total mass of the constituent unit represented by General Formula (1) and the constituent unit represented by General Formula (2) of the polyurethane resin (U) is, based on a total mass of the polyurethane resin (U), 11% by mass to 55% by mass, and a mass of the constituent unit represented by General Formula (3) of the polyurethane resin (U) is, based on the total mass of the polyurethane resin (U), 4% by mass to 30% by mass.

2. The ink jet ink composition according to claim 1, wherein
   the polyolefin polyol (a11) includes a polyolefin polyol having the constituent unit represented by General Formula (1).

3. The ink jet ink composition according to claim 1, wherein
   the active hydrogen atom-containing component (A) further contains a low-molecular-weight polyol component (a2) having no ionic group and having a chemical formula weight or a number-average molecular weight of less than 500, and/or a compound (a3) having an ionic group and an active hydrogen atom, and
   the low-molecular-weight polyol component (a2) contains a branched aliphatic diol having 3 to 12 carbon atoms.

4. The ink jet ink composition according to claim 1, further comprising:
   one of a polyolefin wax or a silicone emulsion in an amount of 0.05% by mass to 5% by mass relative to a total mass of the ink jet ink composition.

5. The ink jet ink composition according to claim 1, wherein
   the resin dispersion is in an amount of 1% by mass to 20% by mass relative to a total mass of the ink composition.

6. The ink jet ink composition according to claim 1, further comprising:
   an organic solvent.

7. The ink jet ink composition according to claim 6, wherein
   the organic solvent includes a nitrogen-containing solvent or glycol ethers having 8 or fewer carbon atoms.

8. The ink jet ink composition according to claim 1, wherein the ink jet ink composition is used for recording on a polar base material and recording on a low-polar base material.

9. An ink set comprising:
   a white ink containing a white coloring material; and
   a non-white ink containing a non-white coloring material, wherein
   at least one of the white ink and the non-white ink is the ink jet ink composition according to claim 1.

10. An ink jet recording method comprising:
    ejecting the ink jet ink composition according to claim 1 from an ink jet head to attach the ink jet ink composition to a recording medium.

11. The ink jet recording method according to claim 10, wherein recording is performed using a white ink containing a white coloring material and a non-white ink containing a non-white coloring material, and at least one of the white ink and the non-white ink is the ink jet ink composition.

* * * * *